(12) United States Patent
Seto et al.

(10) Patent No.: US 11,390,192 B2
(45) Date of Patent: Jul. 19, 2022

(54) SLIDE DEVICE FOR VEHICLE SEAT

(71) Applicant: SHIROKI CORPORATION, Fujisawa (JP)

(72) Inventors: Haruki Seto, Kanagawa (JP); Koji Kumagai, Toyokawa (JP)

(73) Assignee: SHIROKI CORPORATION, Fujisawa (JP)

( * ) Notice: Subject to any disclaimer, the term of this patent is extended or adjusted under 35 U.S.C. 154(b) by 137 days.

(21) Appl. No.: 16/647,777

(22) PCT Filed: Nov. 2, 2018

(86) PCT No.: PCT/JP2018/040907
§ 371 (c)(1),
(2) Date: Mar. 16, 2020

(87) PCT Pub. No.: WO2019/093250
PCT Pub. Date: May 16, 2019

(65) Prior Publication Data
US 2020/0231069 A1 Jul. 23, 2020

(30) Foreign Application Priority Data
Nov. 8, 2017 (JP) .............................. JP2017-215973

(51) Int. Cl.
*B60N 2/06* (2006.01)
*B60N 2/08* (2006.01)
*B60N 2/07* (2006.01)

(52) U.S. Cl.
CPC ................. *B60N 2/08* (2013.01); *B60N 2/06* (2013.01); *B60N 2/07* (2013.01)

(58) Field of Classification Search
CPC ........ B60N 2/12; B60N 2/123; B60N 2/0232; B60N 2/067; B60N 2/0722; B60N 2/04;
(Continued)

(56) References Cited

U.S. PATENT DOCUMENTS 4,378,101 A * 3/1983 Kazaoka .............. B60N 2/0705
248/429
4,671,571 A * 6/1987 Gionet ................... B60N 2/123
248/429
(Continued)

FOREIGN PATENT DOCUMENTS

JP     H09267670 A    10/1997
JP       4482475 B2    6/2010
(Continued)

OTHER PUBLICATIONS

International Search Report (PCT/ISA/210) dated Feb. 5, 2019, by the Japanese Patent Office as the International Searching Authority for International Application No. PCT/JP2018/040907.
(Continued)

*Primary Examiner* — Nkeisha Smith
(74) *Attorney, Agent, or Firm* — Buchanan Ingersoll & Rooney PC

(57) ABSTRACT

According to one embodiment, a vehicle-seat slide device includes a rail to be fixed to a floor, the rail extending in a vehicle front-back direction; a slider slidably attached to the rail and fixed to a seat; a lock member being movable between a lock position at which the slider is locked to one of slide positions on the rail and a lock release position at which the slider is released from being locked to the rail; a support member fixed to the slider; and an operational member supported by the support member to be rotatable about a rotational center extending in a vehicle lateral direction. The operational member receives an input from an input member to rotate in a first rotational direction around the rotational center to thereby move the lock member from the lock position to the lock release position.

2 Claims, 16 Drawing Sheets

(58) Field of Classification Search
CPC ... B60N 2/07; B60N 2/06; B60N 2/08; B60N 2/0825; B60N 2/0831
USPC .............................. 248/424, 425, 429, 430
See application file for complete search history.

(56) References Cited

U.S. PATENT DOCUMENTS

| | | | |
|---|---|---|---|
| 5,820,216 A * | 10/1998 | Feuillet | B60N 2/123 297/341 |
| 8,408,649 B2 * | 4/2013 | Ito | B60N 2/0825 297/341 |
| 2015/0321583 A1 | 11/2015 | Sasaki et al. | |
| 2017/0057381 A1 | 3/2017 | Nihonmatsu et al. | |

FOREIGN PATENT DOCUMENTS

| | | | |
|---|---|---|---|
| JP | 2015214267 A | 12/2015 |
| JP | 2015214268 A | 12/2015 |
| JP | 2017047728 A | 3/2017 |
| JP | 2018189085 A | 11/2018 |

OTHER PUBLICATIONS

Written Opinion (PCT/ISA/237) dated Feb. 5, 2019, by the Japanese Patent Office as the International Searching Authority for International Application No. PCT/JP2018/040907.

* cited by examiner

SLIDE DEVICE FOR VEHICLE SEAT

CROSS-REFERENCE TO RELATED APPLICATIONS

This application is a national stage application of International Application No. PCT/JP2018/040907, filed Nov. 2, 2018, which designates the United States, incorporated herein by reference, and which claims the benefit of priority from Japanese Patent Application No. 2017-215973, filed Nov. 8, 2017, the entire contents of which are incorporated herein by reference.

TECHNICAL FIELD

The present invention relates generally to a vehicle-seat slide device.

BACKGROUND ART

Conventionally, vehicle-seat slide devices are known, which include a lever, a cable, and a slide lock to rotate the lever by being pulled through the cable and release the slide lock (for example, refer to Patent Literature 1).

CITATION LIST

Patent Literature

Patent Document 1: Japanese patent No. 4482475

SUMMARY OF INVENTION

Problem to be Solved by the Invention

Conventionally, however, the lever may tilt or bend, being pulled via the cable, which may make it difficult to release the slide lock, for example. Enhancing rigidity of the lever or a lever support member as a preventive measure may result in increasing the device in size or weight, or degrading layout, for example.

An object of the present invention is, for example, to provide a vehicle-seat slide device of a structure that is difficult to incline or bend when pulled via the cable.

Means for Solving Problem

According to a vehicle-seat slide device of the present invention includes, for example, a rail to be fixed to a floor, the rail extending in a vehicle front-back direction; a slider slidably attached to the rail and fixed to a seat; a lock member being movable between a lock position and a lock release position, the lock position at which the slider is locked to one of slide positions on the rail, the lock release position at which the slider is released from being locked to the rail; a support member fixed to the slider; and an operational member supported by the support member to be rotatable about a rotational center extending in a vehicle lateral direction, the operational member that receives an input from an input member to rotate in a first rotational direction around the rotational center to thereby move the lock member from the lock position to the lock release position. A pulled part of the operational member by the input member and a pressing part of the operational member relative to the lock member are offset in position in opposite directions from a supported part of the operational member by the support member in the vehicle lateral direction.

In the vehicle-seat slide device, the operational member includes a first contact part that contacts the support member to restrict the operational member from rotating in the first rotational direction, and the pulled part and the first contact part are included in an input wall located on one side of the supported part in the vehicle lateral direction.

The vehicle-seat slide device includes a biasing amber that biases the operational member in a second rotational direction around the rotational center, the second rotational direction being opposite to the first rotational direction. The operational member includes a second contact part that contacts the support member to restrict the operational member from rotating around the rotational center in the second rotational direction. The second contact part and a biased part of the operational member are included in a central wall supported by the support member. The biased part is applied with biasing force by the biasing member.

In the vehicle-seat slide device, the operational member includes a first contact part that contacts the support member to restrict the operational member from rotating in the first rotational direction. The pulled part and the first contact part are included in an input wall located on one side of the supported part in the vehicle lateral direction. The support member includes a wall. The first contact part and the second contact part are able to contact opposite surfaces of the wall.

Effect of the Invention

According to the vehicle-seat slide device, the pulled part and the pressing part are oppositely offset in position from the supported part in the vehicle lateral direction. That is, as compared with the pulled part and the pressing part offset from the supported part in the same vehicle lateral direction, for example, it is possible to ensure the balance of the operational member with respect to the supported part in the vehicle lateral direction. By such a configuration, for example, the support member can be prevented from being inclined or bent in the vehicle lateral direction when applied with force from the cable and the operational member.

DESCRIPTION OF EMBODIMENTS

The following will disclose exemplary embodiments of the present invention. Elements of the following embodiments, and functions and results (effects) obtained by the elements are merely exemplary. The present invention can be implemented by elements other than the elements as disclosed below. The present invention can attain at least one of various effects (including derivative effects) obtained by the elements. In the specification, ordinal numbers are used to discriminate parts or components, locations, positions, and directions for the sake of convenience, and not intended to indicate priority or order.

In the respective drawings, arrows indicating directions are illustrated for the sake of convenience. The arrow X indicates frontward in a vehicle front-back direction, the arrow Y indicates rightward in a vehicle lateral direction, and the arrow z indicates upward in a vehicle vertical direction. Rightward is a direction viewed from a vehicle traveling forward.

Seat Structure and Operation

Figure 1:
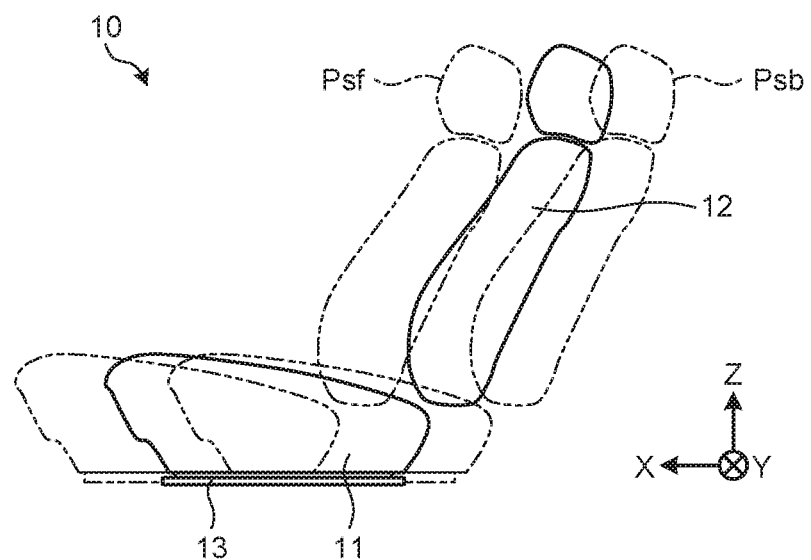
FIG. 1 is a schematic and exemplary side view illustrating an operation of a vehicle seat in a slide mode according to an embodiment.
Figure 2:
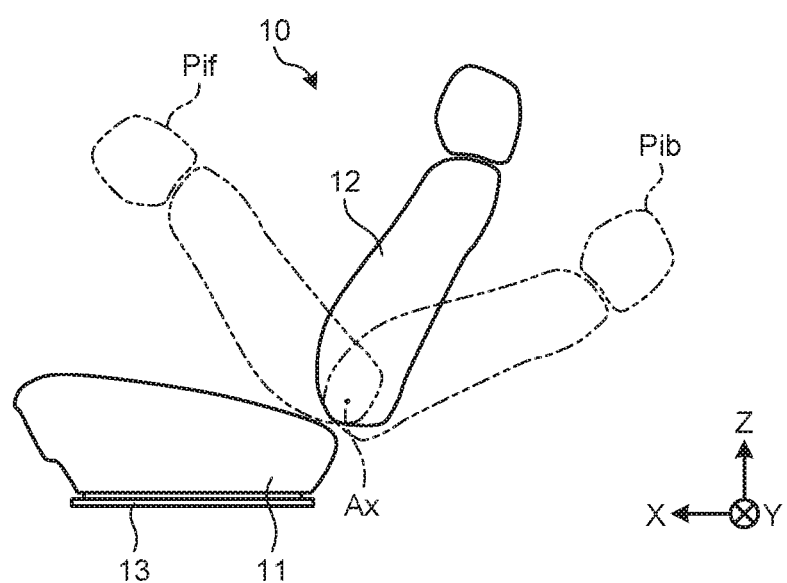
FIG. 2 is a schematic and exemplary side view illustrating an operation of the vehicle seat in a reclining mode according to the embodiment.
Figure 3:
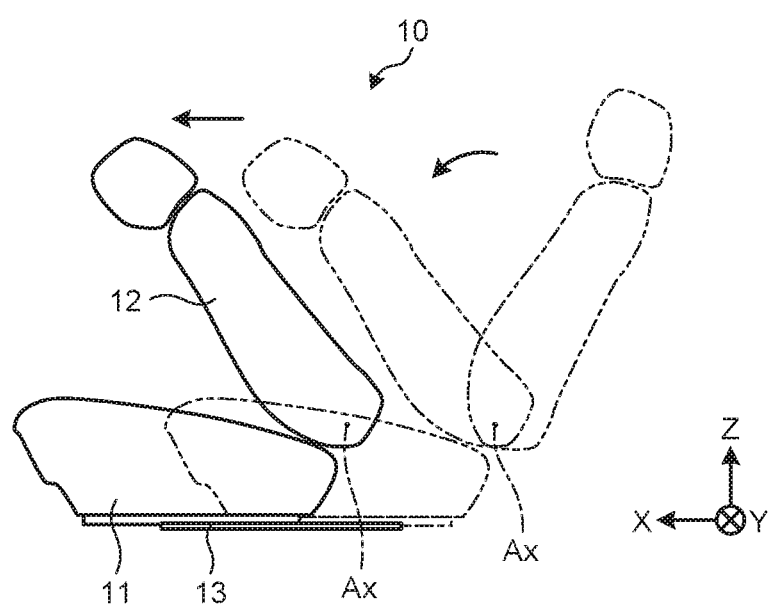
FIG. 3 is a schematic and exemplary aide view illustrating an operation of the vehicle seat in a walk-in mode according to the embodiment.

FIGS. 1 to 3 are side views of a seat 10 for a vehicle. FIG. 1 is a diagram illustrating an operation of the seat 10 in a slide mode, FIG. 2 is a diagram illustrating an operation of the seat 10 in a reclining mode, and FIG. 3 is a diagram illustrating an operation of the seat 10 in a walk-in mode.

As illustrated in FIG. 1, the vehicle seat 10 is slidable between a front position Psf and a rear position Psb, and fixable at one of two or more positions between the front position Psf and the rear position Psb. In the present embodiment, the seat 10 is supported to be movable by lower rails 13 (rail) extending in the vehicle front-back direction. A slide lock mechanism (not illustrated in FIGS. 1 to 3) is switched between a locked state that the seat 10 cannot be slid and an unlocked state that the seat 10 is slidable. In the following, the locked state of the slide lock mechanism is referred to as a slide locked state, and the unlocked state of the slide lock mechanism is referred to as a slide unlocked state.

The seat 10 includes a seat cushion 11 and a seat back 12. As illustrated in FIG. 2, the seat back 12 is movable between a forward tilt position Pif and a rearward tilt position Pib, and fixable at any of two or more positions between the forward tilt position Pif and the rearward tilt position Pib. The forward tilt position Pif may also be called a folded position, and the rearward tilt position Pib may also be called an unfolded position. In the present embodiment, the seat back 12 is rotatable about a rotational center Ax located at a bottom of the seat back 12 and extending in the vehicle lateral direction, and the tilt angle of the seat back 12 may be variably set. A reclining lock mechanism (not illustrated in FIGS. 1 to 3) is switched between a locked state that the seat back 12 cannot move with respect to the seat cushion 11 and an unlocked state that the seat back 12 is movable with respect to the seat cushion 11. In the following, the locked state of the reclining lock mechanism is referred to as a reclining locked state, and the unlocked state of the reclining lock mechanism is referred to as a reclining unlocked state.

In the present embodiment, the seat 10 is operable in three slide and reclining modes as follows.

Slide Mode: FIG. 1

In slide mode, the seat 10 slides along the lower rails 13. For example, the slide lock mechanism is switched from the slide locked state to the slide unlocked state in response to an occupant's operation of a slide releasing lever (not illustrated) located in a lower front part of the seat cushion 11. The slide lock mechanism is switched from the slide unlocked state to the slide locked state in response to an occupant's releasing the slide releasing lever.

Reclining Mode: FIG. 2

In reclining mode, the seat back 12 rotates about the rotational center Ax. For example, in response to an occupant's given operation (for example, manual pulling-up) of a first arm (not illustrated in FIGS. 1 to 3), which is located on a side of the seat cushion 11, the reclining lock mechanism is switched from the reclining locked state to the reclining unlocked state. In response to an occupant's releasing the first arm from the given operation, the reclining lock mechanism is switched from the reclining unlocked state to the reclining locked state.

Walk-in Mode: FIG. 3

In walk-in mode, the seat 10 slides toward the front side of the vehicle while the seat back 12 is inclined forward at a given angle. In response to an occupant's given operation (for example, pedal or manual pressing-down) of a second arm (not illustrated in FIG. 3), the reclining lock mechanism is switched from the reclining locked state to the reclining unlocked state, and the slide lock mechanism is switched from the slide locked state to the slide unlocked state. In the slide unlocked state, the seat 10 receives biasing force from a biasing member (not illustrated) or external force and becomes movable in the vehicle front-back direction. For example, moving the forward tilted seat 10 forward can ensure a wider path for passengers to get in and off the vehicle.

Seat Moving Device

Figure 4:
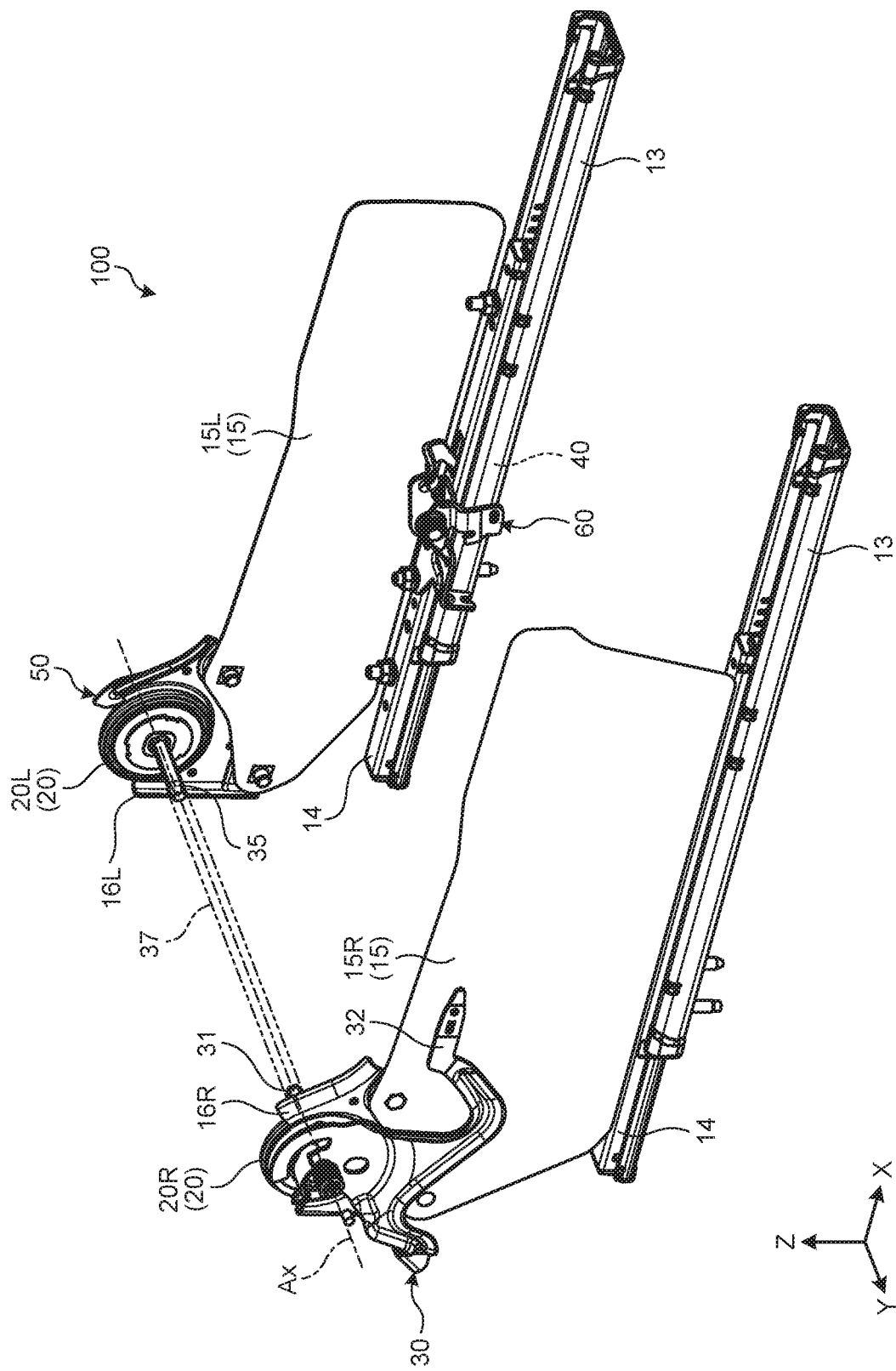
FIG. 4 is a schematic and exemplary perspective view illustrating a schematic structure of a seat moving device of the vehicle seat according to the embodiment.
Figure 5:
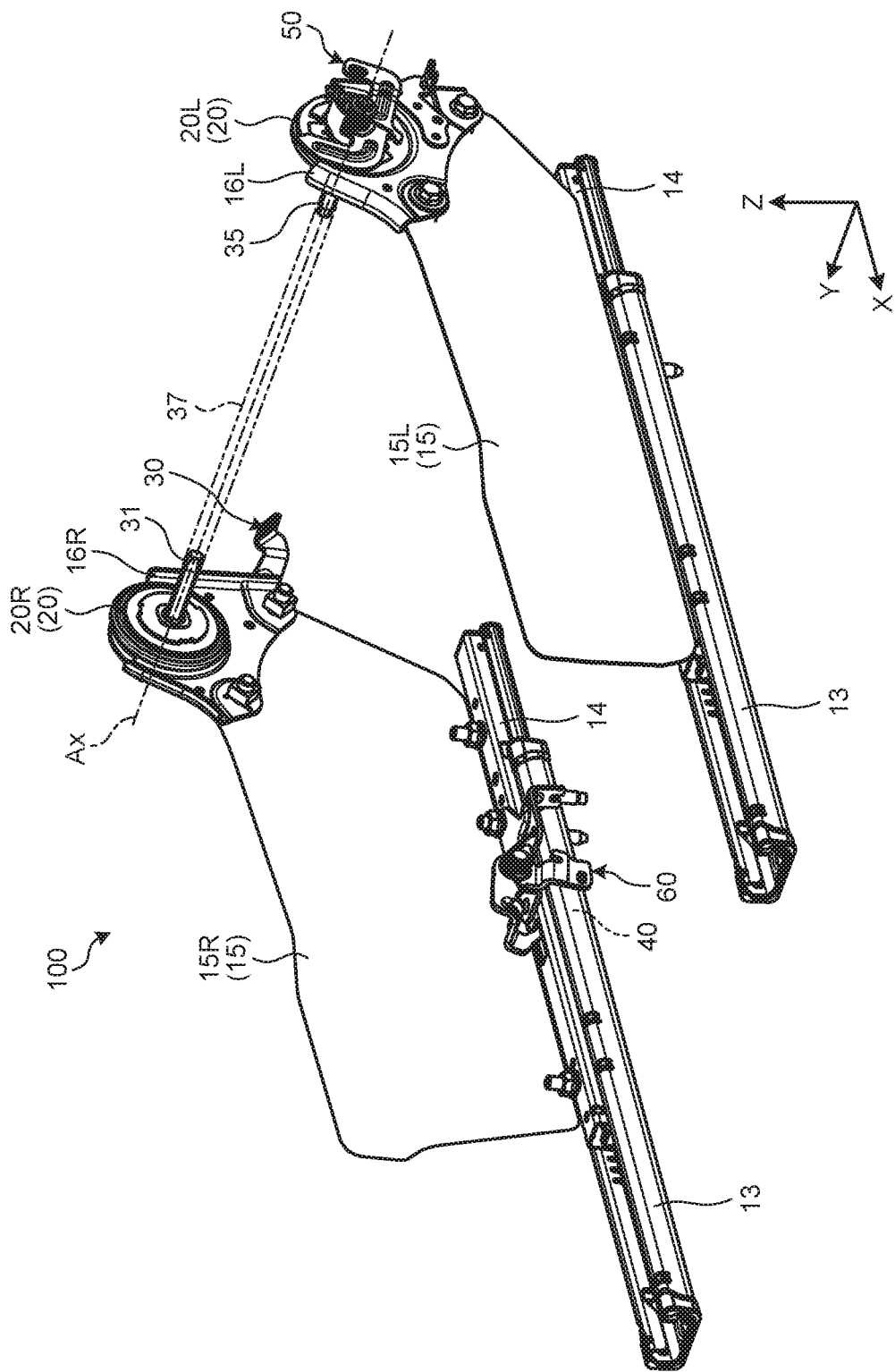
FIG. 5 is a schematic and exemplary perspective view illustrating a schematic structure of the seat moving device of the vehicle seat according to the embodiment, as viewed from a direction different from in FIG. 4.

FIG. 4 is a perspective view illustrating a schematic structure of a seat moving device 100 that implements the three modes, and FIG. 5 is a perspective view of the seat moving device 100 as viewed from a direction different from in FIG. 4.

As illustrated in FIGS. 4 and 5, two lower rails 13 extend in parallel with each other in the vehicle front-back direction. The lower rails 13 slidably support upper rails 14 in the vehicle front-back direction. The upper rails 14 support cushion bases 15 as a framework member of the seat cushion 11. The seat back 12 is rotatably supported by the cushion bases 15 about the rotational center Ax. Thus, along with motion of the upper rails 14 on the lower rails 13 in the vehicle front-back direction, the seat cushion 11 and the seat back 12, that is, the seat 10 moves in the vehicle front-back direction. The lower rails 13 may also be simply referred to as rails, and the upper rail 14 may also be referred to as a slider.

The upper rails 14 are equipped with respective slide lock releasing devices 60. The slide lock releasing devices 60 serve to switch a status of slide lock mechanisms 40, which lock the upper rails 14 and the seat 10 to the lower rails 13, from the slide locked state to the slide unlocked state. In the slide locked state the upper rails 14 are locked to the lower rails 13. In the slide unlocked state the upper rails 14 are released from being locked to the lower rails 13. The slide lock mechanisms 40 and the slide lock releasing devices 60 will be described later.

Supports 16L and 16R are fixed to two left and right cushion bases 15L and 15R. As illustrated in FIG. 4, a reclining lock mechanism 20R (20) and a reclining lock releasing device 30 are attached to the support 16R fixed to the right cushion base 15R. As illustrated in FIG. 5, a reclining lock mechanism 20L (20) and a link mechanism 50 are attached to the support 16L fixed to the left cushion base 15L. The cushion bases 15L and 15R and the supports 16L and 16R are components of the seat cushion 11. That is, the cushion bases 15L and 15R and the supports 16L and 16R constitute an exemplary seat cushion 11.

The reclining lock releasing device 30 releases the reclining lock mechanisms 20L and 20R (20) from locking in response to an operation of a release lever 32. The link mechanism 50 pulls a cable (not illustrated in FIGS. 4 and 5) to operate the slide lock releasing device 60 in response to a forward tilt of the seat back 12.

Reclining Lock Mechanism and Reclining Lock Releasing Device

Figure 6:
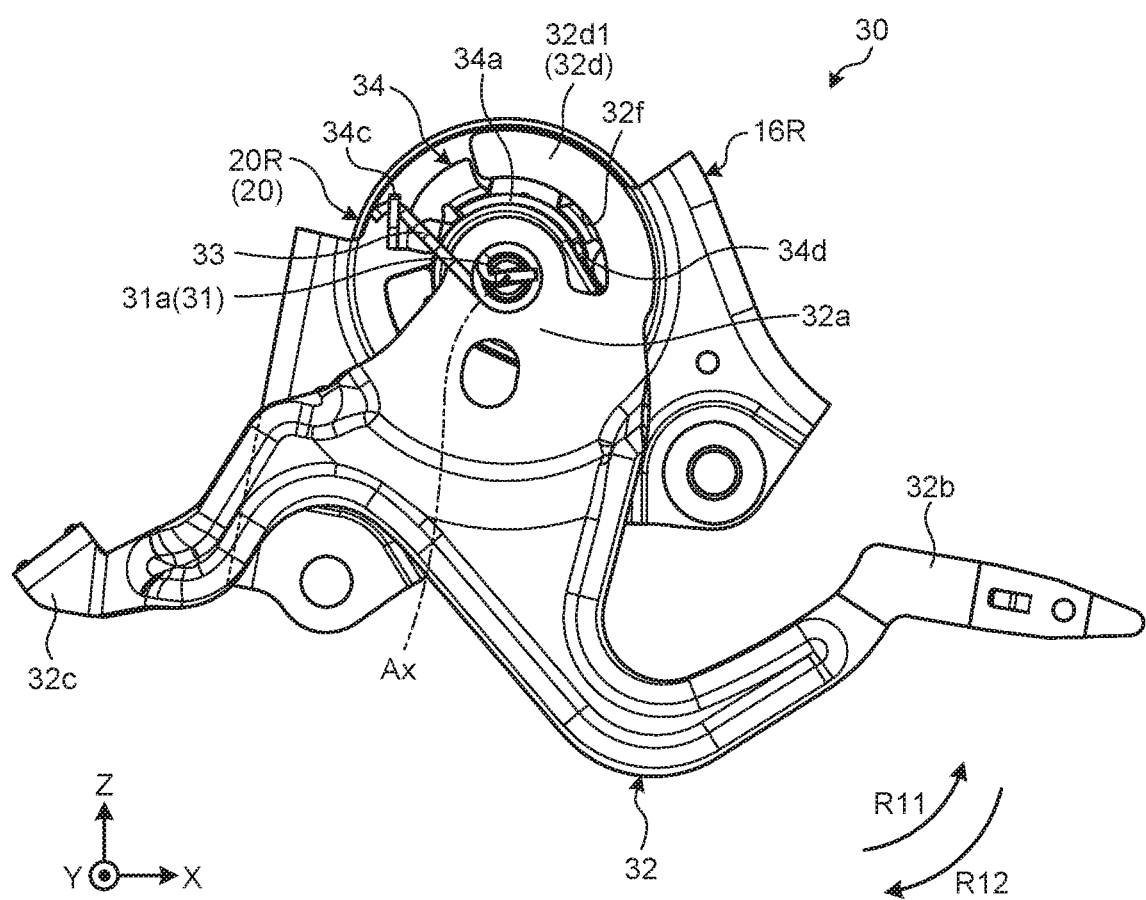
FIG. 6 is a schematic and exemplary front view of a reclining lock mechanism and a reclining lock releasing device of the vehicle seat according to the embodiment, as viewed from the right side in a vehicle lateral direction.
Figure 7:
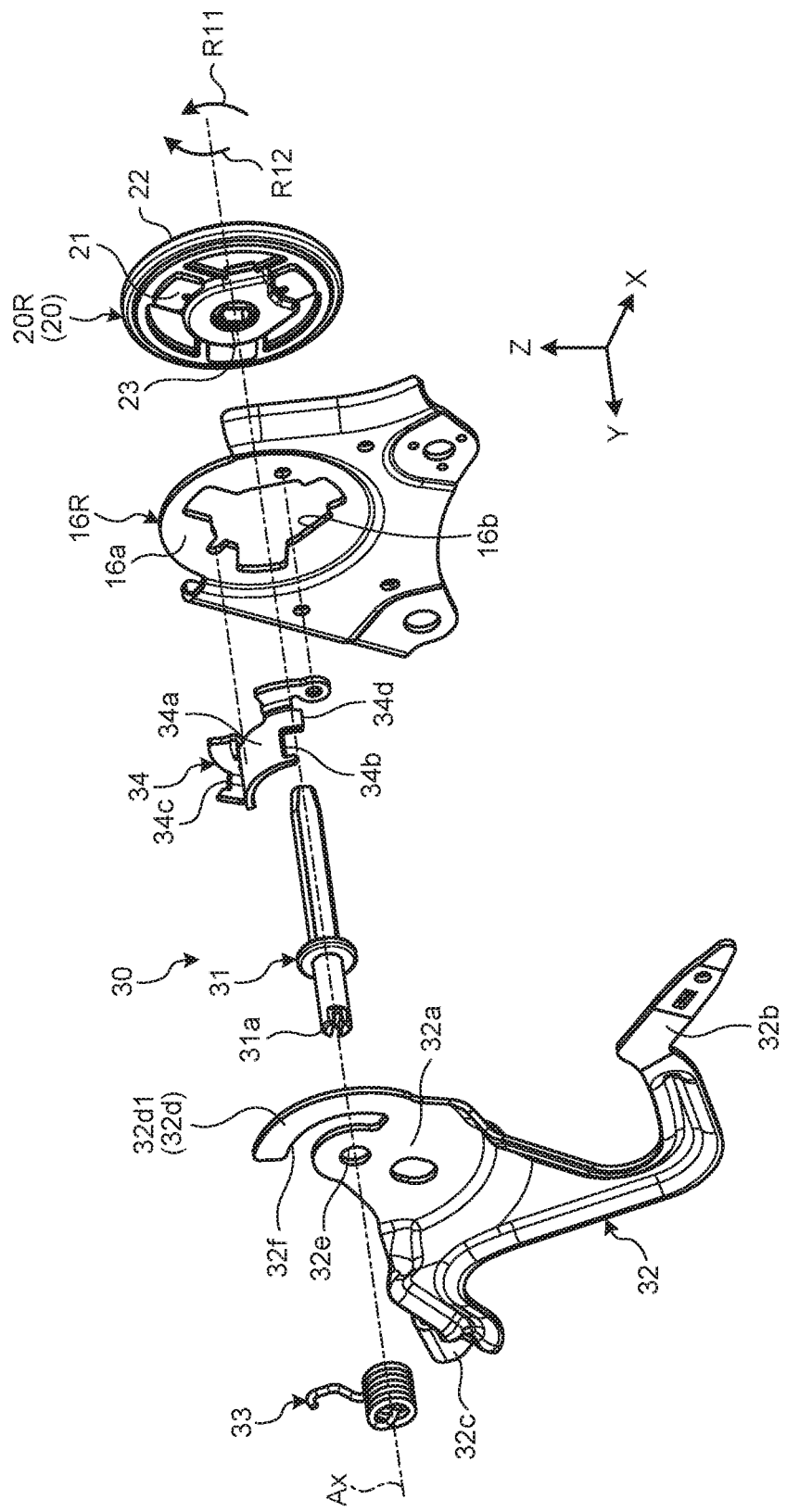
FIG. 7 is a schematic and exemplary exploded perspective view of the reclining lock mechanism and the reclining lock releasing device of the vehicle seat according to the embodiment.

FIG. 6 is a front view of the reclining lock mechanism 20R and the reclining lock releasing device 30 as viewed from the right side in the vehicle lateral direction, and FIG. 7 is an exploded perspective view of the reclining lock mechanism 20R and the reclining lock releasing device 30.

As illustrated in FIGS. 6 and 7, the reclining lock mechanism 20R (20) and the reclining lock releasing device 30 are both attached to the support 16R.

The support 16R includes a wall 16a. The wall 16a extends in the front-back direction and vertical direction of the vehicle, intersecting with the vehicle lateral direction. The wall 16a is provided with a through hole 16b. The through hole 16b has a toothed edge for positioning the reclining lock mechanism 20R.

The reclining lock mechanism 20R (20) is fixed to the support 16R in contact with inside of the support 16R in the vehicle lateral direction. The reclining lock mechanism 20R includes a base 21, a rotational part 22, a coupler (not illustrated), an operational part 23, and an operating mechanism (not illustrated). The base 21 is fixed to the support 16R and to the seat cushion 11. The rotational part 22 is fixed to the seat back 12 rotatably about the rotational center Ax. The coupler moves between a coupling position at which the rotational part 22 is coupled to the base 21 and a blocking position at which the rotational part 22 is blocked from the base 21. The operational part 23 is rotatable about the rotational center Ax. The operating mechanism includes, for example, a can mechanism or a biasing member (not illustrated). Along with rotation of the operational part 23 about the rotational center Ax in a direction R11, the operating mechanism moves the coupler to the blocking position, and along with rotation of the operational part 23 in a direction R12, the operating mechanism moves the coupler to the coupling position. The rotational part 22 coupled to the base 21 via the coupler corresponds to the reclining lock mechanism 20 in the reclining locked state. The rotational part 22 non-coupled to the base 21 via the coupler, that is, the rotational part 22 being rotatable about the rotational center Ax corresponds to the reclining lock mechanism 20 in the reclining unlocked state. The direction R11 is referred to as a release direction as an example of operational direction. The direction R12 is referred to as a lock direction as an exemplary opposite direction of the operational direction.

The reclining lock releasing device 30 includes a shaft 31, the release lever 32, a return spring 33, and a projecting wall 34 that are supported by the support 16R. The reclining lock releasing device 30 is located on the right side of the support 16R excluding part of the shaft 31 in the vehicle lateral direction.

The shaft 31 passes through the reclining lock mechanism 20R, and rotates together with the operational part 23 of the reclining lock mechanism 20R. The release lever 32 is fixed to the shaft 31. Thus, the release lever 32 is connected to the operational part 23 via the shaft 31. The shaft 31 and the release lever 32 rotate about the rotational center Ax together with the operational part 23. The return spring 33 biases the shaft 31, the release lever 32, and the operational part 23 toward their initial positions, that is, in the direction R12 around the rotational center Ax. The shaft 31 includes a hook 31a at an outer distal end in the vehicle lateral direction. The hook 31a is provided with a cutout to hook the return spring 33. The return spring 33 is an exemplary biasing member.

The projecting wall 34 is fixed to the support 16R. The projecting wall 34 includes a surrounding wall 34a of a partially cylindrical form extending circumferentially around the rotational center Ax. The outer periphery of the surrounding wall 34*a* functions as a guide for a spiral spring to bias the seat back 12 (refer to FIGS. 1 to 3) in a forward tilt direction around the rotational center Ax. The surrounding wall 34*a* is provided with a hook 34*b* having a cutout for hooking the spiral spring. The projecting wall 34 is provided with a hook 34*c* having a cutout for hooking one and of the return spring 33.

The release lever 32 has a plate shape, and expands, intersecting with the vehicle lateral direction. The release lever 32 includes a base 32*a*, a first arm 32*b*, a second arm 32*c*, and a weight arm 32*d*. The release lever 32 is an exemplary operation lever.

The base 32*a* is provided with a through hole 32*e* through which the shaft 31 passes. The through hole 32*e* may have an edge of a positioning form (not illustrated) such as a linear part and a toothed part for defining a mounting angle with respect to the shaft 31 around the rotational center Ax and moving the shaft 31 and the release lever 32 together in the direction R11 and the direction R12.

The first arm 32*b* is bent below the rotational center Ax, extending forward from the base 32*a*. The occupant seated on the seat 10 (refer to FIGS. 1 to 3) pulls up the first arm 32*b* as an input operation, and the release lever 32 rotates in the direction R11 by the pulling-up. The first arm 32*b* may also be called a pulling-up arm or a reclining arm.

The second arm 32*c* extends rearward from the base 32*a* below the rotational center Ax. The occupant not seated on the seat 10 equipped with the reclining lock releasing device 30 presses down the second arm 32*c* with his or her foot as an input operation, and the release lever 32 rotates in the direction R11 by the pressing-down. The second arm 32*c* may also be called a pressing-down arm or a walk-in arm.

The weight arm 32*d* projects upward from a top front end of the base 32*a*. The weight arm 32*d* includes a circular arc 32*d*1 extending in an arc form circumferentially about the rotational center Ax. An arc-shaped cutout 32*f* extends between the weight arm 32*d* (circular arc 32*d*) and the base 32*a* circumferentially about the rotational center Ax. The surrounding wall 34*a* of the projecting wall 34 passes through the cutout 32*f* in the vehicle lateral direction. In other words, the cutout 32*f* accommodates the surrounding wall 34*a*. The weight arm 32*d* is an exemplary weight. The cutout 32*f* is an exemplary gap, and may also be called an opening.

Figure 8:
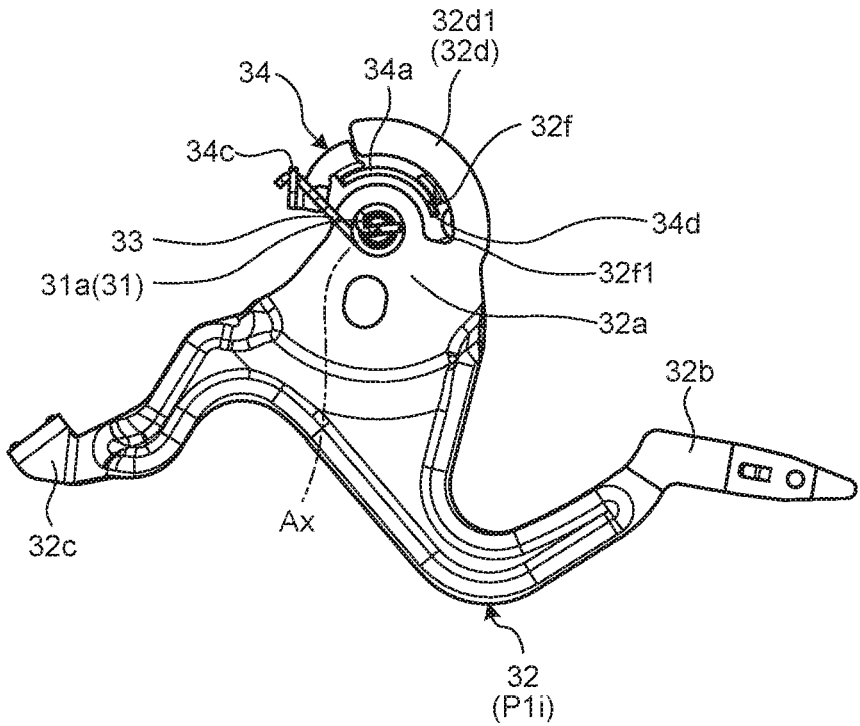
FIG. 8 is a schematic and exemplary front view of part of the reclining lock releasing device of the vehicle seat according to the embodiment as viewed from the same direction as in FIG. 6, and illustrates a release lever at an initial position.
Figure 9:
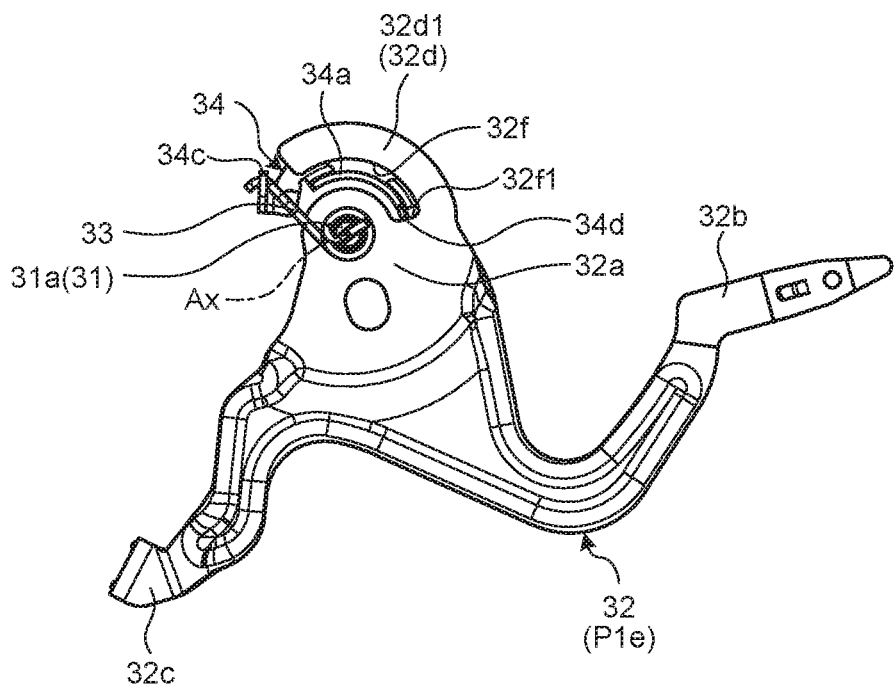
FIG. 9 is a schematic and exemplary front view of part of the reclining lock releasing device included in the vehicle seat according to the embodiment as viewed from the same direction as in FIG. 6, and illustrates the release lever at a restricted position.

FIGS. 8 and 9 are front views of part of the reclining lock releasing device 30 as viewed from the same direction as in FIG. 6. FIG. 8 is a diagram illustrating the release lever 32 at an initial position P1*i*, and FIG. 9 is a diagram illustrating the release lever 32 at a restricted position P1*e*.

By pulling up the first arm 32*b* or pressing down the second arm 32*c*, the release lever 32 can rotate by a given angle from the initial position P1*i* in FIG. 8 in the direction R11. Along with rotation of the release lever 32 in the direction R11, the shaft 31 and the operational part 23 (refer to FIG. 7) rotate in the direction R11.

The release lever 32 can rotate in the direction R11 up to the restricted position P1*e* in FIG. 9. At the restricted position P1*e*, an end 32*f*1 (edge) of the cutout 32*f* contacts an end 34*d* of the projecting wall 34 (also refer to FIG. 7) in the direction R12. In other words, the end 34*d* contacts the end 32*f*1 to restrict the rotation of the release lever 32 in the direction R11. That is, the end 34*d* functions as a stopper that restricts a rotational range of the release lever 32 in the direction R11. The end 34*d* is an exemplary stopper.

The reclining lock mechanism 20R transitions from the reclining locked state to the reclining unlocked state in response to the rotation of the release lever 32 in the direction R11 to a reclining-lock release position (not illustrated) between the initial position P1*i* (refer to FIG. 8) and the restricted position P1*e* (refer to FIG. 9). When released from operational force in the direction R11, the release lever 32 is biased by the return spring 33 to rotate (return) in the direction R12. Thereby, the reclining lock mechanism 20R transitions (returns) from the reclining unlocked state to the reclining locked state.

As illustrated in FIGS. 4 and 5, the shaft 31 is coupled to a shaft 35 via a coupling shaft 37. Thus, the rotation of the release lever 32 is transmitted to the other reclining lock mechanism 20L via the shaft 31, the coupling shaft 37, and the shaft 35. That is, the reclining lock mechanism 20L coordinates with the reclining lock mechanism 20R.

In the release lever 32 (operation lever) according to the present embodiment, at least at the initial position P1*i* the weight arm 32*d* (weight) projects upward from the base 32*a*, and is at least partially located above the rotational center Ax. As described above, the first arm 32*b* and the second arm 32*c* are located below the rotational center Ax. Thus, without the weight arm 32*d*, the center of gravity of the release lever 32 will be largely distant downward from the rotational center Ax. In such structure, while the first arm 32*b* and the second arm 32*c* are not in operation (initial position P1*i*), forward or rearward acceleration to the center of gravity of the release lever 32 is likely to cause the release lever 32 to rotate due to the acceleration (inertial force) irrespective of non-operation of the first arm 32*b* and the second arm 32C. To deal with such a situation, for example, the release lever 32 may be increased in rolling friction resistance. However, such a release lever 32 exerts larger friction to the operator of the release lever 32, which increases operation torque and deteriorating operability.

In this regard, in the reclining lock releasing device 30 of the present embodiment, the release lever 32 includes the weight arm 32*d* projecting upward from the base 32*a*. According to the present embodiment, the weight arm 32*d* works to place the center of gravity of the release lever 32 more upward, that is, closer to the rotational center Ax, so that the release lever 32 is avoided from rotating due to acceleration (inertial force) as compared with the release lever without the weight arm 32*d*. Thus, according to the present embodiment, for example, it is possible to prevent the release lever 32 from unintentionally rotating due to acceleration applied thereto. According to the present embodiment, for example, the release lever 32 of a relatively simple structure can be prevented from unintentionally rotating during non-operation due to acceleration applied thereto, avoiding inconvenience such as increase in the operational force. That is, according to the present embodiment, for example, the release lever 32 of a relatively simple structure can ensure operability in normal operation and be avoided from unintentional rotation caused by acceleration at the same time.

In the present embodiment, the weight arm 32*d* includes the circular arc 32*d*1 extending circumferentially about the rotational center Ax. Thus, according to the present embodiment, for example, the weight arm 32*d* and the release lever 32 can be prevented from being increased in radial size.

In the present embodiment, the projecting wall 34 is fixed to the support 16R, and axially passes through the cutout 32*f* (gap) between the base 32*a* and the weight arm 32*d* of the release lever 32. The end 34*d* of the projecting wall 34 functions as a stopper that restricts the rotational range of the release lever 32 in the direction R11. Thus, according to the present embodiment, for example, the stopper can be located in the cutout 32f, which makes it possible for the reclining lock releasing device 30 to be more compact or simpler in structure than the one including the stopper in a location different from the cutout 32f.

In the present embodiment, the projecting wall 34 includes the hook 34c that hooks the return spring 33. Thus, according to the present embodiment, for example, the projecting wall 34 can be provided with the hook 34c, which makes it possible for the reclining lock releasing device 30 to be more compact or simpler in structure than the one including the hook in a location different from the projecting wall 34.

In the present embodiment, the projecting wall 34 includes the surrounding wall 34a along the circumference. Thus, according to the present embodiment, for example, the surrounding wall 34a can be enhanced in flexural rigidity and torsional rigidity than the one of a linear form. According to the present embodiment, the surrounding wall 34a may function as a guide or a positioner for the spiral spring (not illustrated) located radially outside the surrounding wall 34a, or a barrier that reduces interference between the spiral spring and other components, for example. According to the present embodiment, for example, the surrounding wall 34a extends along the circular arc 32d1 of the weight arm 32d, which enables more compact arrangement of the weight arm 32d and the surrounding wall 34a.

In the present embodiment, the weight arm 32d projects upward from the base 32a in a location distant from the rotational center Ax in the vehicle front-back direction. Thus, according to the present embodiment, the entire weight arm 32d contributes to setting the center of gravity of the release lever 32 upward, for example.

Link Mechanism

Figure 10:
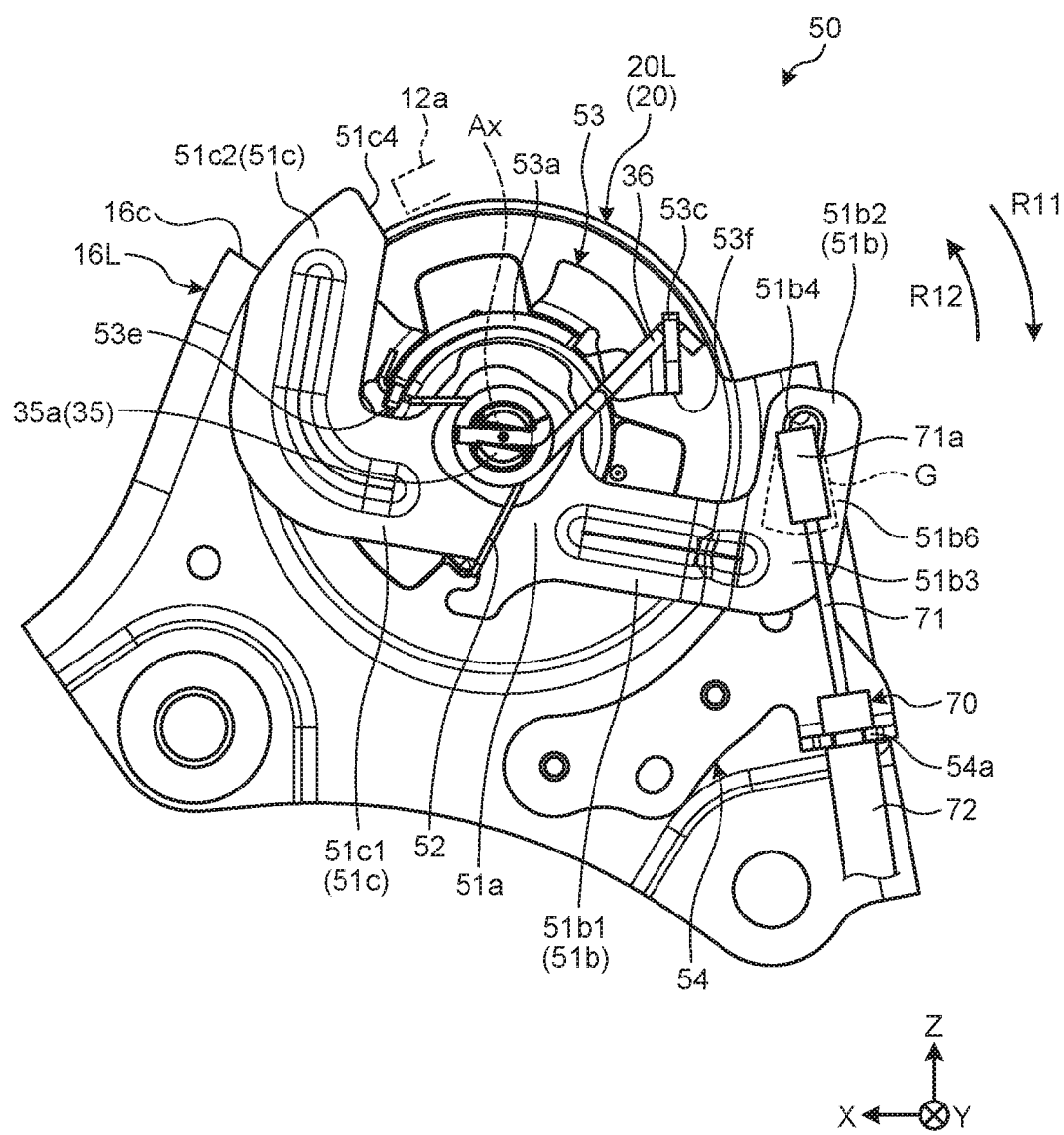
FIG. 10 is a schematic and exemplary front view of the reclining lock mechanism and a link mechanism included in the vehicle seat according to the embodiment as viewed from the left side in the vehicle lateral direction.
Figure 11:
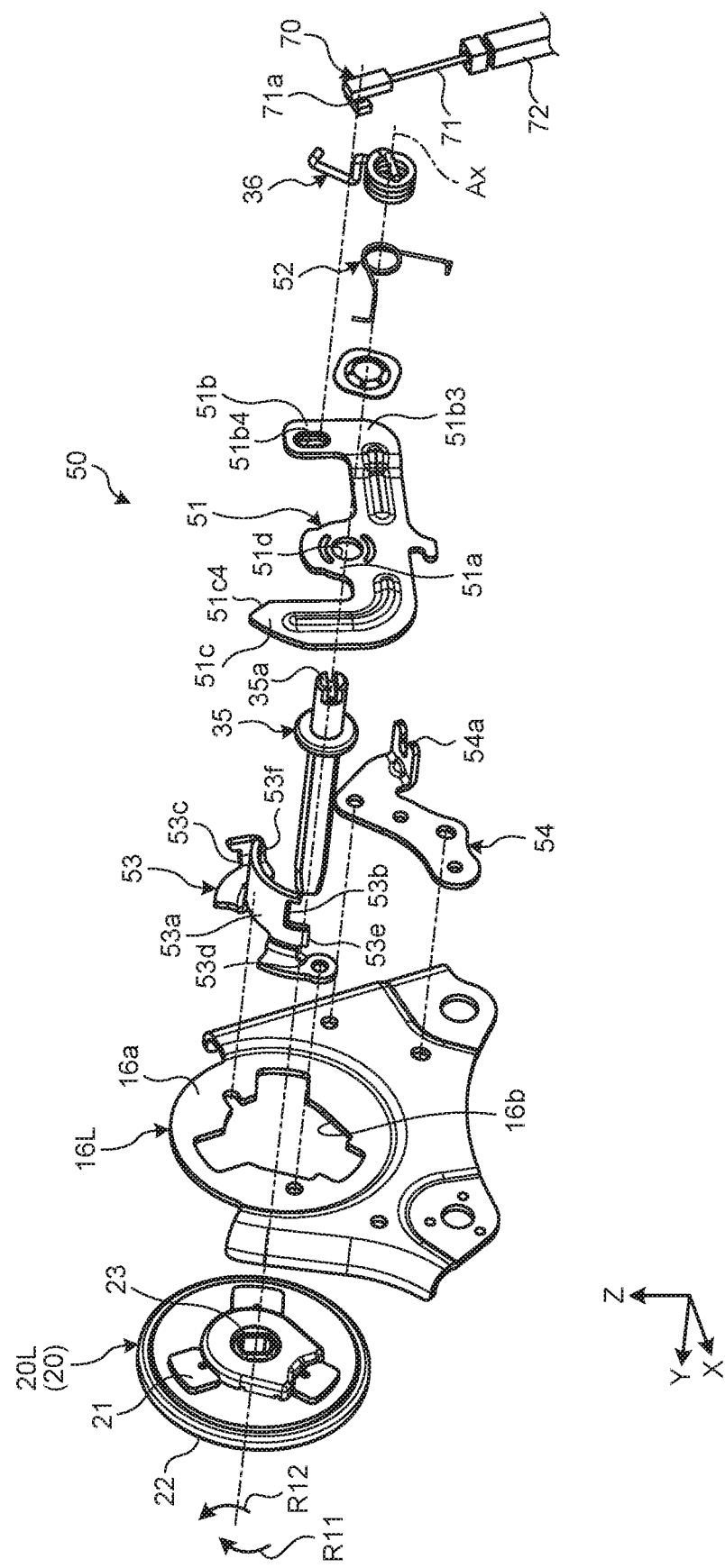
FIG. 11 is a schematic and exemplary exploded perspective view of the reclining lock mechanism and the link mechanism of the vehicle seat according to the embodiment.

FIG. 10 is a front view of the reclining lock mechanism 20L and the link mechanism 50 as viewed from the left side in the vehicle lateral direction, and FIG. 11 is an exploded perspective view of the reclining lock mechanism 20L and the link mechanism 50.

As illustrated in FIGS. 10 and 11, the reclining lock mechanism 20L (20) and the link mechanism 50 are both attached to the support 16L.

The support 16L includes the wall 16a. The wall 16a extends in the vehicle lateral direction and the vehicle front-back direction, intersecting the vehicle vertical direction. The wall 16a is provided with the through hole 16b. The through hole 16b has a toothed edge for positioning the reclining lock mechanism 20L. The wall 16a is an exemplary erected wall.

The reclining lock mechanism 20L (20) is fixed to the support 16L in contact with inside of the support 16L in the vehicle lateral direction. As with the reclining lock mechanism 20R, the reclining lock mechanism 20L moves the coupler to the blocking position along with rotation of the operational part 23 in the direction R11 about the rotational center Ax, and moves the coupler to the coupling position along with rotation of the operational part 23 in the direction R12. In this case, the reclining lock mechanism 20L and the reclining lock mechanism 20R have a mirror image relationship in terms of structure.

The reclining lock releasing device 30 includes the shaft 35, a return spring 36, and a projecting wall 53 (hook 53c) that are supported by the support 16L. The reclining lock releasing device 30 is located on the left side of the support 16L excluding part of the shaft 35 in the vehicle lateral direction.

The shaft 35 passes through the reclining lock mechanism 20L, and rotates together with the operational part 23 of the reclining lock mechanism 20L. The shaft 35 rotates about the rotational center Ax together with the operational part 23. The return spring 36 biases the shaft 35 and the operational part 23 toward their initial positions, that is, in the direction R12 around the rotational center Ax. The shaft 35 includes, at an outer distal end in the vehicle lateral direction, a hook 35a having a cutout that hooks the return spring 36. The return spring 36 is an exemplary biasing member.

As illustrated in FIGS. 4 and 5, the shaft 35 is coupled to the shaft 31 via the coupling shaft 37. Thus, the operation of the release lever 32 rotates the shaft 35 and the operational part 23 in the direction R11 about the rotational center Ax via the coupling shaft 37, and the biasing force from the return spring 36 (and the return spring 33 biasing the shaft 31) rotates the shaft 35 and the operational part 23 in the direction R12 about the rotational center Ax. That is, the shafts 31 and 35 are coupled to each other via the coupling shaft 37, so that the reclining lock mechanism 20L coordinates with the reclining lock mechanism 20R.

The link mechanism 50 includes a link member 51, a return spring 52, a projecting wall 53, and a bracket 54. The link mechanism 50 is located on the left side of the support 16L in the vehicle lateral direction.

The link member 51 is rotatably supported by the shaft 35 about the rotational center Ax. The link member 51 is pressed forward by a pressing member 12a (refer to FIG. 10) secured in the seat back 12 to tilt and rotate, when the seat back 12 (refer to FIGS. 1 to 3) is tilted forward by a given angle or more. In this case, the forward tilt direction of the seat back 12 around the rotational center Ax corresponds to the direction R12. Thus, the link member 51 is pressed by the pressing member 12a to rotate in the direction R12.

While no occupant is seated on the seat 10, the second arm 32c (walk-in arm) of the release lever 32 is pressed down with a person's foot or hand, placing the reclining lock mechanisms 20 in the reclining unlocked state. The spiral spring than works to bias the seat back 12 in the forward tilt direction, thereby causing the seat back 12 to tilt forward by the given angle or more. That is, the link member 51 rotates in the walk-in mode. The link member 51 pulls an inner wire 71 of a cable 70 connected to the slide lock releasing devices 60 along with such forward tilting of the seat back 12. The slide lock releasing devices 60 transition from the slide locked state to the slide unlocked state by the inner wire 71's being pulled by the link member 51. That is, the link mechanism 50 serves to allow the seat 10 to move forward and backward in response to a forward tilting of the seat 10 in the walk-in mode, as above.

The projecting wall 53 is fixed to the support 16L. The projecting wall 53 includes a surrounding wall 53a of a partially cylindrical form extending circumferentially around the rotational center Ax. The outer periphery of the surrounding wall 53a functions as a guide for the spiral spring that biases the seat back 12 in the forward tilt direction around the rotational center Ax. The surrounding wall 53a is provided with a hook 53b having a cutout that hooks the spiral spring. The projecting wall 63 is provided with the hook 53c having a cutout that hooks the return spring 36. The surrounding wall 53a is provided with a hook 53d having a cutout that hooks the return spring 52.

The bracket 54 is fixed to the support 16L, and projects rearward from the support 16L. The bracket 54A includes a hook 54a having a cutout that hooks an outer tube 72 of the cable 70. The bracket 54 may be integrated with the projecting wall 53.

Figure 12:
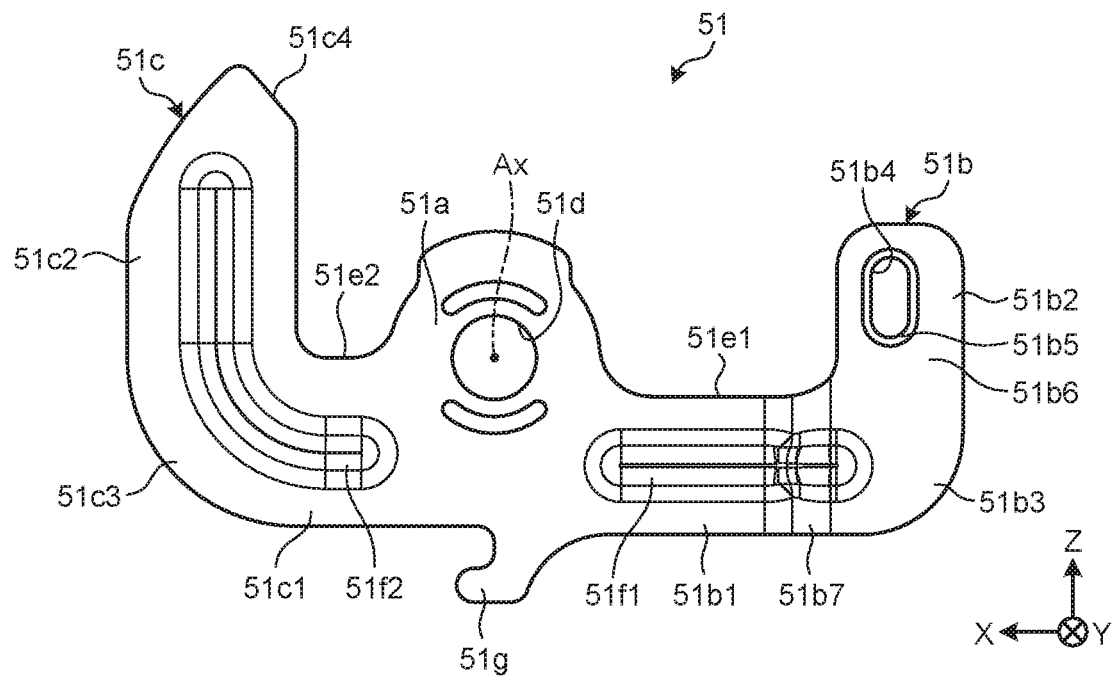
FIG. 12 is a schematic and exemplary front view of a link member of the vehicle seat according to the embodiment as viewed from an axial direction.
Figure 13:
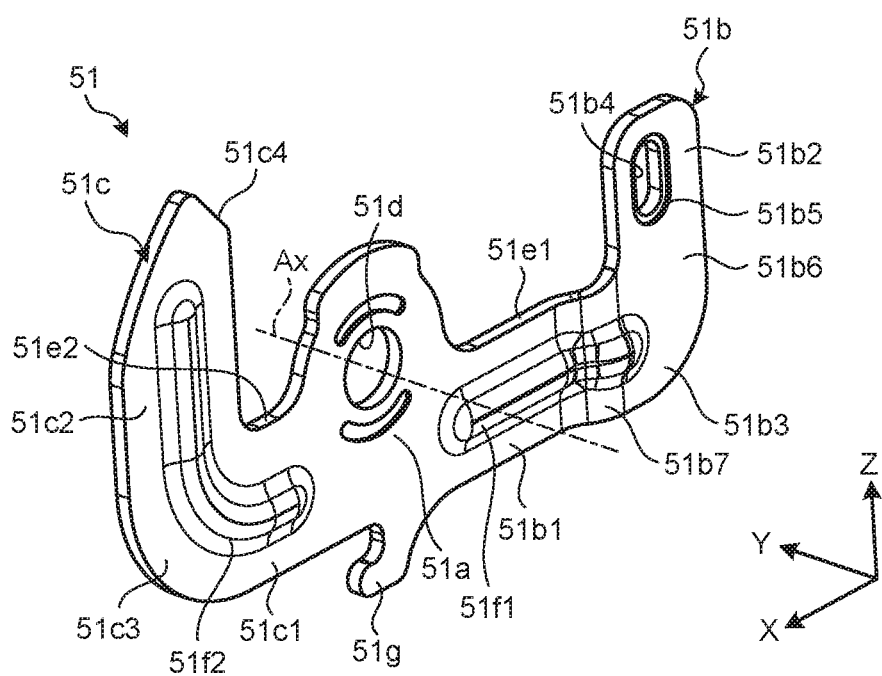
FIG. 13 is a schematic and exemplary perspective view of the link member of the vehicle seat according to the embodiment.
Figure 14:
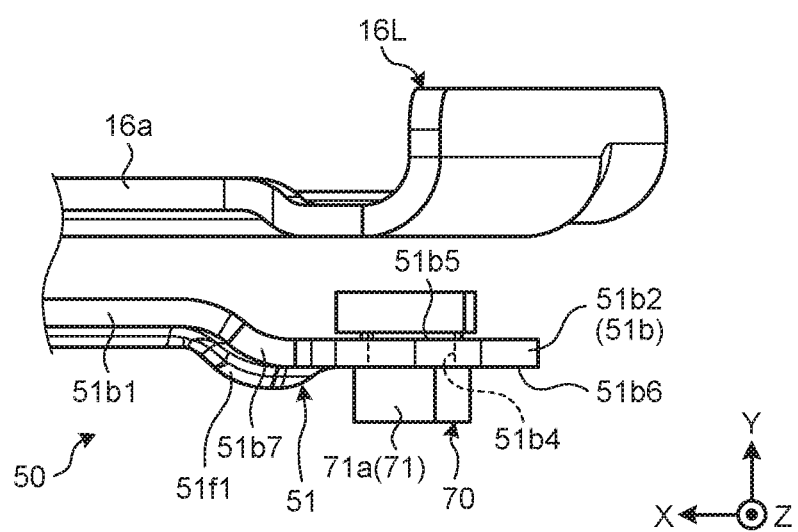
FIG. 14 is a schematic and exemplary plan view of part of the link member and a support of the vehicle seat according to the embodiment.

FIG. 12 is a front view of the link member 51 as viewed from the axial direction, FIG. 13 is a perspective view of the link member 51, and FIG. 14 is a plan view of part of the link member 51 and the support 16L. As illustrated in FIGS. 10 and 11, the link member 51 expands, intersecting with the vehicle lateral direction. As illustrated in FIGS. 12 and 13, the link member 51 has a plate shape. The link member 51 includes a base 51a, an output arm 51b, and an input arm 51c.

The base 51a is provided with a through hole 51d through which the shaft 35 passes. The link member 51 and the shaft 35 do not coordinate, and rotate independently of each other.

The output arm 51b includes a first extension 51b1 and a first projection 51b2. Both of the first extension 51b1 and the first projection 51b2 expand (extend), intersecting with the vehicle lateral direction. The first extension 51b1 extends rearward from a lower part of the base 51a. That is, the first extension 51b1 extends away from the rotational center Ax. The output arm 51b is curved upward by approximately 90 degrees at a bend 51b3 located at a distal end (rear end) of the first extension 51b1 away from the rotational center Ax. The first projection 51b2 extends upward. An upper part of the bend 51b3 extends substantially in the direction R12. That is, the output arm 51b is bent at the bend 51b3 in the direction R12, and the first projection 51b2 projects in the direction R12 from a location in the first extension 51b1 away from the rotational center Ax. The extending direction of the first extension 51b1 may be a direction away from the rotational center Ax, and is not limited to a rearward direction. The projecting direction of the first projection 51b2 may be substantially parallel to the direction R12 and is not limited to an upward direction.

Such a bent shape of the output arm 51b defines a cutout 51e1 of a substantially U-shape between the base 51a and the output arm 51b.

The first projection 51b2 is provided with a through hole 51b4 in the axial direction. The through hole 51b4 may also be called an opening. As illustrated in FIG. 11, the inner wire 71 of the cable 70 includes a hook 71a at a distal end, and the hook 71a hooks an edge 51b5 (in the present embodiment, a bottom edge) of the through hole 51b4. The edge 51b5 is an exemplary hook. The hook 71a is an exemplary end. The hook 71a and the inner wire 71 hooked to the edge 51b5 extend in the direction R11.

As described above, in the present embodiment, the first projection 51b2, projecting from the bend 51b3 in the direction R12, is provided with the through hole 51b4. Thus, as is understood from FIG. 10, part of the bend 51b3 and the first projection 51b2 (the region indicated by a dashed line G in FIG. 10) is adjacent to the through hole 51b4 in the direction R11 and overlapped with the hook 71a hooked to the edge 51b5 of the through hole 51b4 in the axial direction, and can function as a guide for the hook 71a. That is, part of the bend 51b3 and the first projection 51b2 is an exemplary guide. In the present embodiment, the link member 51 includes a plane 51b6 facing the hook 71a and extending between the first projection 51b2 and the bend 51b3. The plane 51b6 expends, intersecting with the axial direction. Owing to such a structure, the hook 71a is movable along the plane 51b6 along with the motion of the link member 51. The plane 51b6 may be called a guide surface or a sliding surface.

As illustrated in FIGS. 13 and 14, the link member 51 is provided with a step 51b7 between the first extension 51b1, and the bend 51b3 and the first projection 51b2 of the output arm 51b. The output arm 51b of such a step form works to place the bend 51b3 and the first projection more distant from the wall 16a of the support 16L than the first extension 51b. In other words, the gap between the wall 16a, and the bend 51b3 and the first projection 51b2 is larger than the gap between the first extension 51b1 and the wall 16a.

As illustrated in FIGS. 12 to 14, the output arm 51b includes a reinforcing part 51f1 from the first extension 51b1 to the bend 51b3. The reinforcing part 51f1 projects in the axial direction from a width center of the output arm 51b, and extends along the length of the output arm 51b, for example. However, the reinforcing part 51f1 may be formed by bending the width edge of the output arm 51b in the axial direction. The reinforcing part 15f1 extends across the step 51b7. Except for the step 51b7 and the reinforcing part 51f1, the first extension 51b1, the bend 51b3, and the first projection 51b2 all extend, intersecting with (orthogonal to) the axial direction. The reinforcing part 51f1 is an exemplary first reinforcing part.

As illustrated in FIGS. 13 and 14, the entire edge 51b5 of the through hole 51b4 of the first projection 51b2 is dented from the plane 51b6 and projects toward the wall 16a of the support 16L. If the edge 51b5 of the through hole 51b4 projects from the plane 51b6, the hook 71a is difficult to be along the plane 51b6. In this regard, in the present embodiment, the edge 51b5 of the through hole 51b4 is dented from the plane 51b6, allowing the hook 71a to stably contact the plane 51b6. Additionally, the edge 51b5 projects oppositely to the plane 51b5, thereby reducing wobble of the hook 71a.

As illustrated in FIGS. 12 and 13, the input arm 51c includes a second extension 51c1 and a second projection 51c2. Both of the second extension 51c1 and the second projection 51c2 expand (extend), intersecting with the vehicle lateral direction. The second extension 51c1 extends forward from a bottom part of the base 51a. That is, the second extension 51c1 extends oppositely to the first extension 51b1 of the output arm 51b. The first extension 51b1 and the second extension 51c1 are aligned on a straight line. The input arm 51c1 is curved upward by substantially 90 degrees at a bend 51c3 located at a distal and (front end) of the second extension 51c1 and away from the rotational center Ax. The second projection 51c2 extends upward. The upper part of the bend 51c3 extends substantially in the direction R11. That is, the input arm 51c is bent at the bend 51c3 in the direction R11, and the second projection 51c2 projects from a location in the second extension 51c1 away from the rotational center Ax in the direction R11. The extending direction of the second extension 51c1 may be a direction away from the rotational center Ax and different from the extending direction of the first extension 51b1 and is not limited to a forward direction or the direction opposite to the extending direction of the first extension 51b1. The projecting direction of the second projection 51c2 may be substantially parallel to the direction R11 and is not limited to an upward direction.

Such a bent input arm 51c defines a cutout 51e2 of a substantially U-shape between the base 51a and the input arm 51c.

The second projection 51c2 has a radially extending end 51c4. The end 51c4 is pressed by the pressing member 12a (refer to FIG. 10). In other words, the second projection 51c2 contacts the forward tilting seat back 12. The end 51c4 may be called a pressed part or an input part.

The input arm 51c includes a reinforcing part 51f2 extending from the second extension 51c1 to the second projection 51c2 through the band 51c3. The reinforcing part 51f2 projects in the axial direction from a width center of the input arm sic, and extends along the length of the input arm 51c, for example. However, the reinforcing part 51f2 may be formed by banding the width edge of the input arm 51*c*1 in the axial direction. The second extension 51*c*1, the bend 51*c*3, and the second projection 51*c*2 extend, intersecting with (orthogonal to) the axial direction. The reinforcing part 51*f*2 is an exemplary second reinforcing part.

The link member 51 includes a hook 51*g* having a cutout that hooks the return spring 52.

Figure 15:
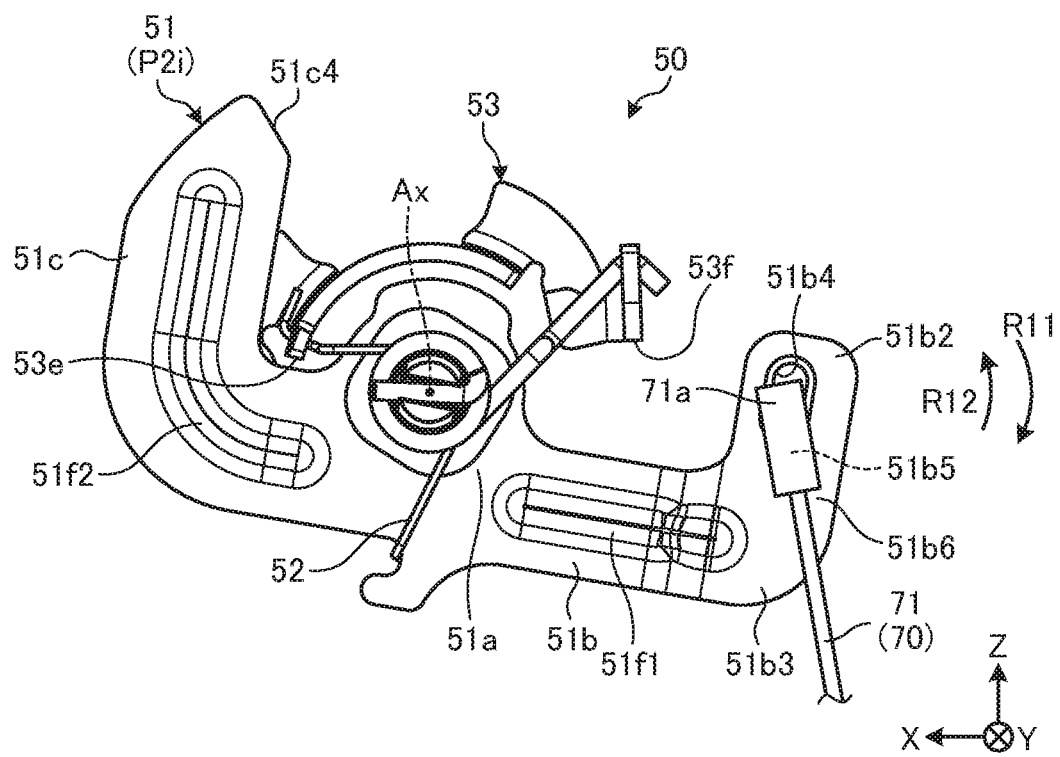
FIG. 15 is a schematic and exemplary front view of part of the link mechanism of the vehicle seat according to the embodiment as viewed from the same direction as in FIG. 10, and illustrates the link member at an initial position.
Figure 16:
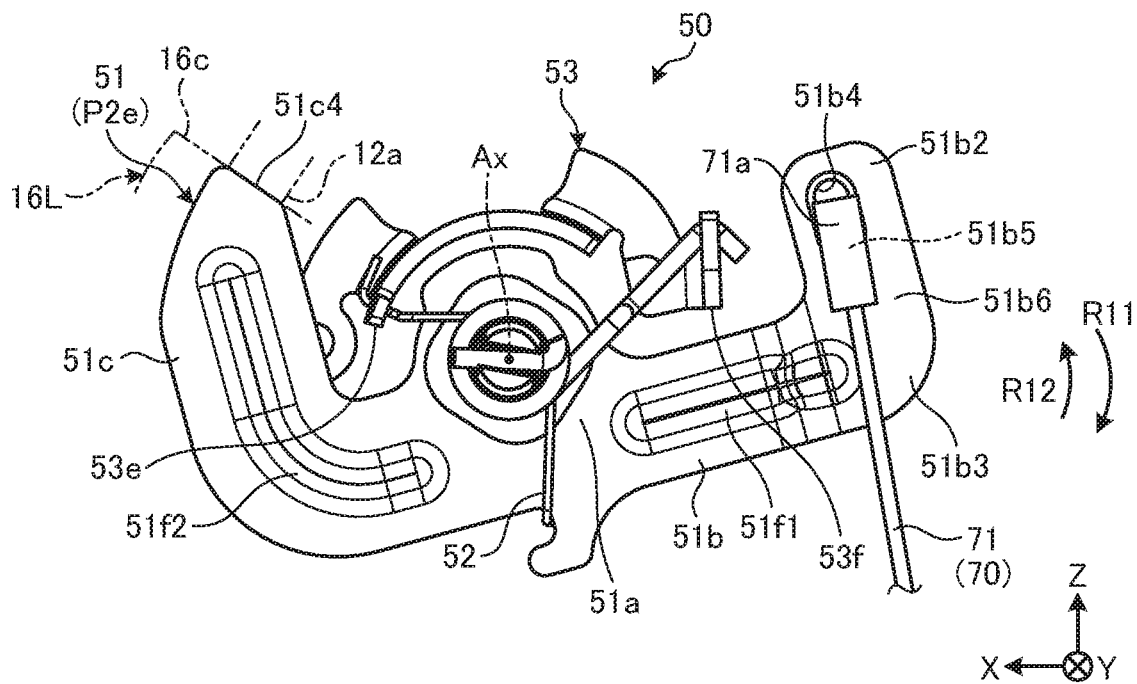
FIG. 16 is a schematic and exemplary front view of part of the link mechanism of the vehicle seat according to the embodiment as viewed from the same direction as in FIG. 10, and illustrates the link member at a restricted position.

FIGS. 15 and 16 are front views of part of the link mechanism 50 as viewed from the same direction as in FIG. 10. FIG. 15 is a diagram illustrating the link member 51 at an initial position P2*i*, and FIG. 16 is a diagram illustrating the link member 51 at a restricted position P2*a*.

Along with the forward tilting of the seat back 12, the end 51*c*4 is pressed by the pressing member 12*a* (refer to FIGS. 10 and 16), thereby enabling the link member 51 to rotate from the initial position P2*i* by a given angle in the direction R12. The rotation of the link member 51 in the direction R12 works to pull upward the inner wire 71 hooked to the edge 51*b*5 of the through hole 51*b*4.

The link member 51 is rotatable in the direction R12 up to the restricted position P2*e* in FIG. 16. At the restricted position P2*e*, the pressing member 12*a* contacts an upper front end 16*c* (refer to FIGS. 10 and 16) of the support 16L. Being pulled by the inner wire 71, the link member 51 is biased in the direction R11. Thus, the end 16*c* functions as an indirect stopper that restricts the rotational range of the link member 51 in the direction R12 by contacting the pressing member 12*a*. The link member 51 is biased by the return spring 52 in the direction R12. This serves to resolve slack of the inner wire 71, and maintain the hook 71*a* hooked to the edge 51*b*5 of the through hole 51*b*4 in the direction R11.

Along with the inner wire 71 being pulled by the link member 51, the slide lock releasing devices 60 (refer to FIGS. 4 and 5) cause the slide lock mechanisms 40 to transition from the slide locked state to the slide unlocked state. When the link member 51 is located at a slide lock release position (not illustrated) between the initial position P2*i* (refer to FIG. 15) and the restricted position P2*e* (refer to FIG. 16), the slide lock mechanisms 40 transition from the slide locked state to the slide unlocked state.

Receiving an input from outside, the seat back 12 is inclined rearward against biasing force from the spiral spring (not illustrated), which releases the pressing member 12*a* from contacting with the end 16*c* and moves the pressing member 12*a* away from the end 16*c*. The link member 51 is then pulled by the inner wire 71 and rotates in the direction R11 and returns to the initial position P2*i* (refer to FIG. 15). The slide lock mechanisms 40 transition (return) from the slide unlocked state to the slide locked state.

As illustrated in FIG. 15, an end 53*e* of the surrounding wall 53*a* of the projecting wall 53 in the direction R12 faces, with a gap, the input arm 51*c* of the link member 51 located at the initial position P21. The end 53*e* contacts the input arm 51*c* of the link member 51, when caused to rotate in the direction R11 beyond the initial position P2*i* for some reason, and it can thereby function as a spare stopper that restricts the link member 51 from rotating further from the contact position in the direction R11. The end 53*e* faces and contacts the part of the input arm 51*c* including the reinforcing part 51*f*2. Thus, the input arm sic can be prevented from being deformed due to the contact with the end 53*e*. The end 53*e* is an exemplary stopper.

As illustrated in FIG. 16, an end 53*f* of the hook 53*c* of the projecting wall 53 in the direction R11 faces, with a gap, the output arm 51*b* of the link member 51 located at the restricted position P2*e*. The end 53*f* contacts the output arm 51*b* of the link member 51 when caused to rotate in the direction R12 beyond the restricted position P2*e* for some reason, and it can thereby function as a spare stopper that restricts the link member 51 from rotating further from the contact position in the direction R12. The end 53*f* faces and contacts the part of the output arm 51*b* including the reinforcing part 51*f*1. Thus, the output arm 51*b* can be prevented from being deformed due to the contact with the end 53*f*. The end 53*f* is an exemplary stopper.

As described above, in the present embodiment, the first extension 51*b*1 of the output arm 51*b* extends away from the rotational center Ax. The band 51*b*3 is curved in the direction R12 (first rotational direction) from the first extension 51*b*1. The first projection 51*b*2 projects in the direction R12 from the bend 51*b*3. The hook 71*a* of the inner wire 71 (cable 70) hooks the edge 51*b*5 (hook) of the through hole 51*b*4 in the first projection 51*b*2. The part of the bend 51*b*3 and the first projection 51*b*2 adjacent to the edge 51*b*5 in the direction R11 (second rotational direction) functions as a guide for the cable 70. Thus, according to the present embodiment, the cable 70 can be supported by the link member 51 more stably, for example. The guide may be included in at least one of the bend 51*b*3 and the first projection 51*b*2.

In the present embodiment, the bend 51*b*3 of the output arm 51*b* is connected to the first extension 51*b*1 via the step 51*b*7, and extends in a location more apart axially from the wall 16*a* (erected wall) than the first extension 51*b*1, intersecting with the axial direction. Thus, the present embodiment can ensure the gap between the bend 51*b*3 and the wall 16*a* to accommodate the hook 71*a*, preventing interference between the hook 71*a* and the wall 16*a*, for example.

In the present embodiment, the reinforcing part 51*f*1 (first reinforcing part) extends along the first extension 51*b*1 from the first extension 51*b*1 to at least the bend 51*b*3 across the step 51*b*7. Thus, according to the present embodiment, the output arm 51*b* can be prevented from being deformed at the step 51*b*7, for example.

In the present embodiment, the reinforcing part 51*f*2 (second reinforcing part) extends from the second extension 51*c*1 to the second projection 51*c*2. Thus, according to the present embodiment, the input arm sic can be prevented from being deformed between the second extension 51*c*1 and the second projection 51*c*2, for example.

In the present embodiment, the ends 53*e* end 53*f* of the projecting wall 53 function as stoppers that restrict the rotational range of the link member 51. Thus, according to the present embodiment, the link mechanism 50 can be more compact or simpler in structure than the one including a stopper in a member different from the projecting wall 53, for example.

In the present embodiment, the projecting wall 53 includes the hooks 53*b*, 53*c*, and 53*d* that hook the spiral spring (not illustrated) and the return springs 36 and 52. Thus, according to the present embodiment, for example, the projecting wall 53 can include the hooks 53*b*, 53*c*, and 53*d*, so that the link mechanism 50 can be more compact or simpler in structure than the one including hooks on a member different from the projecting wall 53, for example.

In the present embodiment, the projecting wall 53 includes the surrounding wall 53*a* along the circumference. Thus, according to the present embodiment, the surrounding wall 53*a* can be enhanced in flexural rigidity and torsional rigidity from the surrounding wall 53*a* of a linear form, for example. According to the present embodiment, for example, the surrounding wall 53*a* can function as a guide, a positioner, or a barrier for preventing the spiral spring (not illustrated) located radially outside the surrounding wall 53a from interfering other components.

Slide Lock Mechanism and Slide Lock Releasing Device

As illustrated in FIGS. 4 and 5, the two lower rails 13 are disposed with spacing in parallel with each other on the floor in the vehicle lateral direction and extend in the vehicle front-back direction. The upper rails 14 are attached to the respective lower rails 13 in a slidable manner. The upper rails 14 of a given length extend in the vehicle front-back direction. The seat cushion 11 (seat 10) is fixed to the two upper rails 14 astride the two upper rails 14 from above. The lower rails 13 are exemplary rails, and the upper rails 14 are an exemplary slider.

Figure 17:
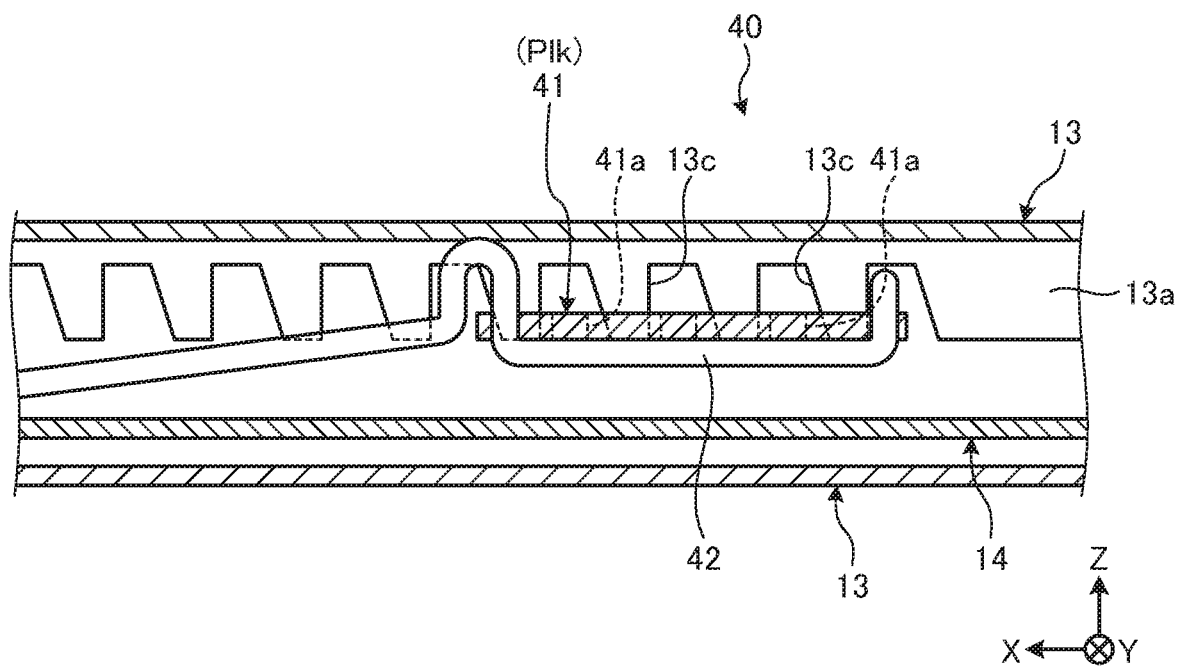
FIG. 17 is a schematic and exemplary side view of a slide lock mechanism of the vehicle seat according to the embodiment, and illustrates a slide looked state.
Figure 18:
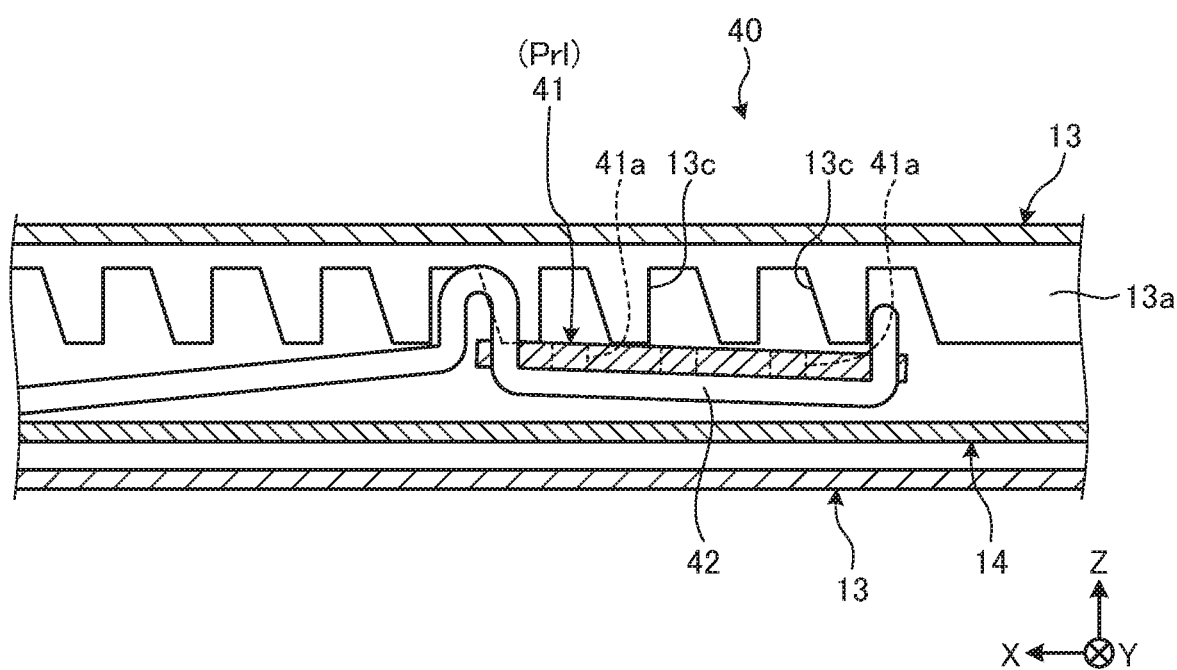
FIG. 18 is a schematic and exemplary side view of the slide lack mechanism of the vehicle seat according to the embodiment, and illustrates a slide unlocked state.

FIGS. 17 and 18 are side views of the slide lock mechanism 40. FIG. 17 illustrates the slide locked state, and FIG. 18 illustrates the slide unlocked state. As illustrated in FIG. 17, in the lower rail 13, a biasing member 42 can bias and raise a lock member 41 from below, and press the lock member 41 against an inner flange 13a of the lower rail 13 from below. The lock member 41 is fixed to one and of the biasing member 42, and the other end (not illustrated) of the biasing member 42 is fixed to the upper rail 14. Thus, in the slide unlocked state in FIG. 18, the biasing member 42 and the lock member 41 can slide in the vehicle front-back direction together with the upper rail 14. The biasing member 42 is, for example, a leaf spring.

The lock member 41 attached to the upper rail 14 is engaged with the inner flange 13a of the lower rail 13, and thereby locked to the inner flange 13a, that is, the lower rail 13. The inner flange 13a extends in the vehicle vertical direction and the vehicle front-back direction. Specifications including the shape of the inner flange 13a are not limited to this example.

As illustrated in FIGS. 17 and 18, the inner flange 13a is provided with a plurality of cutouts 13c (recesses) at regular pitches (intervals) in the vehicle front-back direction. In the bottom edge of the inner flange 13a, the cutouts 13c open downward in the vehicle. FIGS. 17 and 18 illustrate one of two inner flanges 13a.

The lock member 41 has, for example, a substantially quadrangular plate shape extending substantially in the vehicle front-back direction and the vehicle lateral direction, and is provided with a plurality of projections 41a (tabs) on the edges in the vehicle lateral direction at regular pitches (intervals) in the vehicle front-back direction. The cutouts 13c are arranged at the same pitches as the projections 41a are. Specifications including structure and arrangement of the lock member 41 and the biasing member 42 are not limited to this example.

As illustrated in FIG. 17, while the lock member 41 is raised to a lock position Plk by the biasing member 42, the projections 41a of the lock member 41 are accommodated in the cutouts 13c of the inner flange 13a. Thereby, the lock member 41 and the upper rail 14 are locked to the lower rail 13 (slide locked state).

Meanwhile, as illustrated in FIG. 18, the lock member 41 is pressed downward by a projection 62c1 (refer to FIG. 19) of an operational member 62 of each slide lock releasing device 60 (described later) against upward biasing force (elastic repulsive force) of the biasing member 42. The projection 41a is then separated downward from the cutout 13c, placing the lock member 41 at a lock release position Prl below the bottom edge of the inner flange 13a. This enables the lock member 41 and the upper rail 14 to slide with respect to the lower rail 13 in the vehicle front-back direction (slide unlocked state).

As described in detail later, the projection 62c1 of the operational member 62 together with the link member 51 press the lock member 41 downward. The lock member 41 is released from being pressed down by the projection 62c1, and the biasing member 42 raises the lock member 41 from below, and locks the lock member 41 to the inner flange 13a. By such a structure, the slide lock mechanism 40 can lock the lock member 41 to the inner flange 13a at two or more longitudinal positions (optional positions) in the range of the inner flange 13a. In other words, the slide lock mechanism 40 can position the upper rail 14 at two or more longitudinal positions (optional positions) on the lower rail 13.

Figure 19:
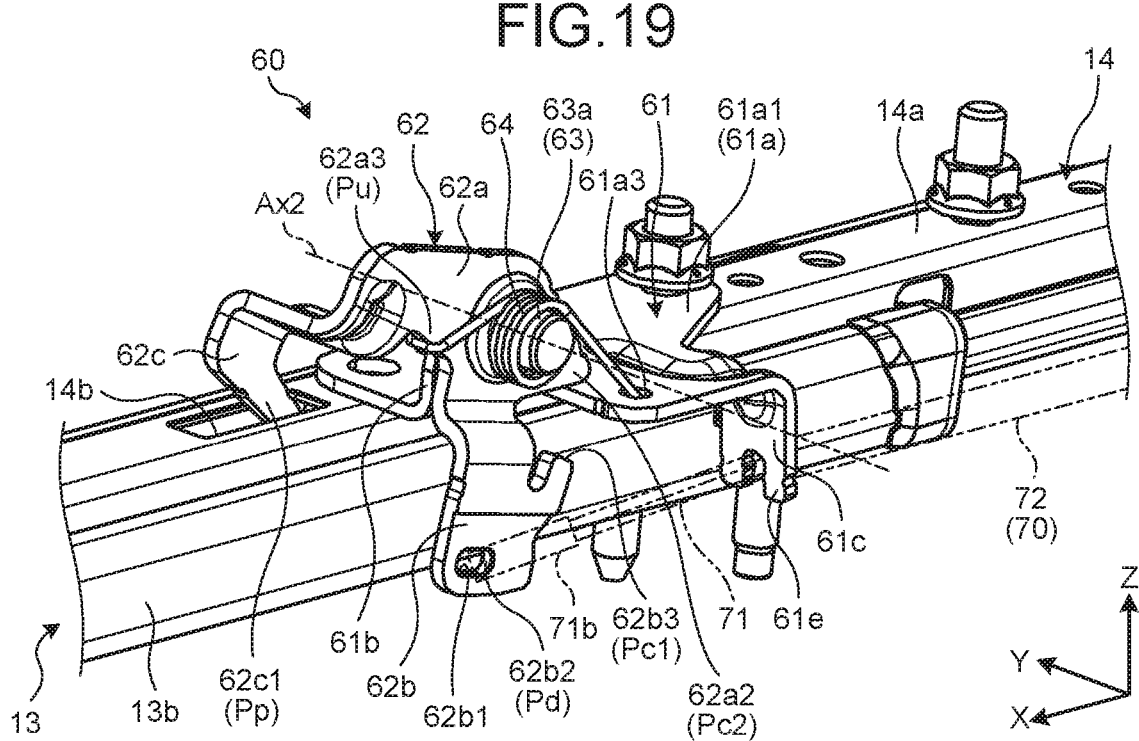
FIG. 19 is a schematic and exemplary perspective view of a lower rail, an upper rail, and a slide lock releasing device included in the vehicle seat according to the embodiment.
Figure 20:
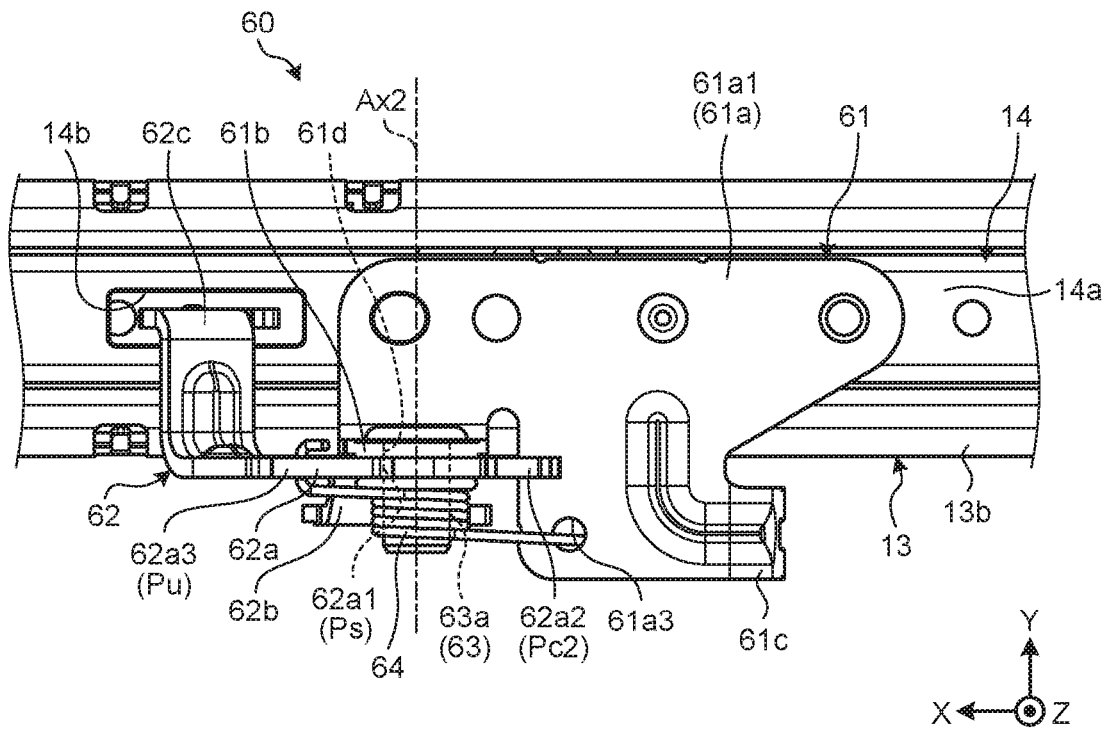
FIG. 20 is a schematic and exemplary plan view of the lower rail, the upper rail, and the slide lock releasing device of the vehicle seat according to the embodiment.
Figure 21:
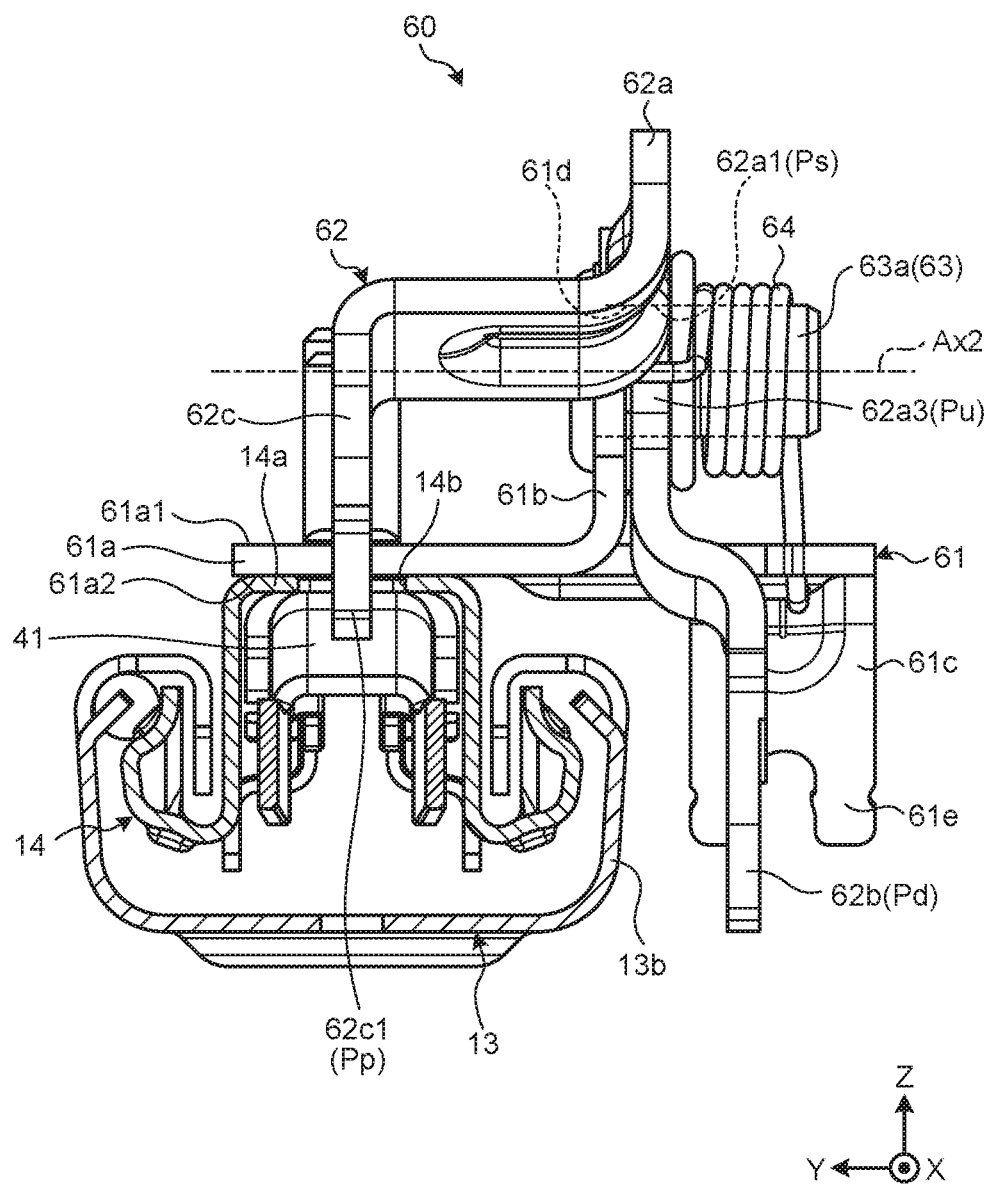
FIG. 21 is a schematic and exemplary front view of the lower rail, the upper rail, and the slide lock releasing device of the vehicle seat according to the embodiment.

FIG. 19 is a perspective view of the lower rail 13, the upper rail 14, and the slide lock releasing device 60, FIG. 20 is a plan view of the lower rail 13, the upper rail 14, and the slide lock releasing device 60, and FIG. 21 is a front view of the lower rail 13, the upper rail 14, and the slide lock releasing device 60. FIGS. 19 to 21 illustrate the slide lock releasing device 60 attached to a right-side one of the two parallel lower rails 13 in a traveling direction, by way of example. In the following the left side of the slide lock releasing device 60 in the vehicle lateral direction corresponds to a direction closer to the other lower rail 13, and the right side thereof corresponds to a direction away from the other lower rail 13.

As illustrated in FIGS. 19 to 21, the slide lock releasing device 60 includes a support member 61, the operational member 62, a shaft 63, and a return spring 64.

The support member 61 includes a bottom wall 61a, an erected wall 61b, and a hanging wall 61c.

The bottom wall 61a is placed on a top face 14a of the upper rail 14 and fixed to the upper rail 14 with a fastener such as screws, for example. The bottom wall 61a expands in the vehicle front-back direction and the vehicle lateral direction, intersecting with the vehicle vertical direction.

The bottom wall 61a is provided with a through hole 61a3 into which one end of the return spring 64 is inserted. The end of the return spring 64 passes the through hole 61a3 of the bottom wall 61a downward, and is hooked to the periphery of the through hole 61a3.

The erected wall 61b projects upward from a left front and of the bottom wall 61a in the vehicle lateral direction substantially above a left sidewall 13b of the lower rail 13. The erected wall 61b expands in the vehicle front-back direction and the vehicle vertical direction, intersecting with the vehicle lateral direction.

As illustrated in FIG. 20, the erected wall 61b is provided with a through hole 61d. The shaft 63 is fixed to the erected wall 61b while passing the through hole 61d in the vehicle lateral direction. The shaft 63 constitutes a cylinder 63a projecting leftward from the erected wall 61b in the vehicle lateral direction.

The hanging wall 61c is located behind the erected wall 61b with spacing, and projects downward from a left rear of the bottom wall 61a in the vehicle lateral direction at a position further leftward than the left sidewall 13b of the lower rail 13. The hanging wall 61c expands in the vehicle lateral direction and the vehicle vertical direction, intersecting with the vehicle front-back direction.

As illustrated in FIGS. 19 and 21, the hanging wall 61c includes a holder 61e having a cutout. An outer tube 72 of the cable 70 is fixed to the holder 61e.

The operational member 62 includes a central wall 62a, an input wall 62b, and an output wall 62c.

The central wall 62a is adjacent to the left side of the erected wall 61b in the vehicle lateral direction. The central wall 62a expands in the vehicle front-back direction and the vehicle vertical direction, intersecting with the vehicle lateral direction.

As illustrated in FIG. 20, the central wall 62a is provided with a through hole 62a1. The shaft 63 passes the through hole 62a1 in the vehicle lateral direction. Clearance between the through hole 62a1 and the outer circumference of the shaft 63 is set relatively small to allow the central wall 62a to swing along the outer circumference of the shaft 63. That is, the shaft 63 rotatably supports the central wall 62a about the rotational center Ax2 in the vehicle lateral direction. The rotational center Ax2 represents the center of the shaft 63.

As illustrated in FIGS. 19 and 20, the central wall 62a includes, at a rear end, a projection 62a2 projecting rearward. The other and of the return spring 64 is hooked to a front part 62a3 of the central wall 62a. The front part 62a3 of the central wall 62a is an exemplary biased part Pu.

As illustrated in FIGS. 19 and 21, the input wall 62b extends downward while bent leftward in a crank form from the bottom of the central wall 62a. The input wall 62b projects downward from a location further leftward than the left sidewall 13b of the lower rail 13. The input wall expands in the vehicle front-back direction and the vehicle vertical direction 62b, intersecting with the vehicle lateral direction.

As illustrated in FIG. 19, the input wall 62b is provided with a through hole 62b1. A hook 71b of the inner wire 71 is hooked to an edge 62b2 of the through hole 62b1. The input wall 62b includes, at the rear and, a projection 62b3 projecting upward.

As illustrated in FIGS. 19 and 21, the output wall 62c extends downward while bent rightward in a crank form from a front part of the central wall 62a. The output wall 62c downwardly passes a through hole 14b in the upper rail 14 and contacts with the top surface of the lock member 41 (refer to FIGS. 17 and 18). The output wall 62c includes, at the bottom end, a projection 62c1 projecting obliquely rearward.

Figure 22:
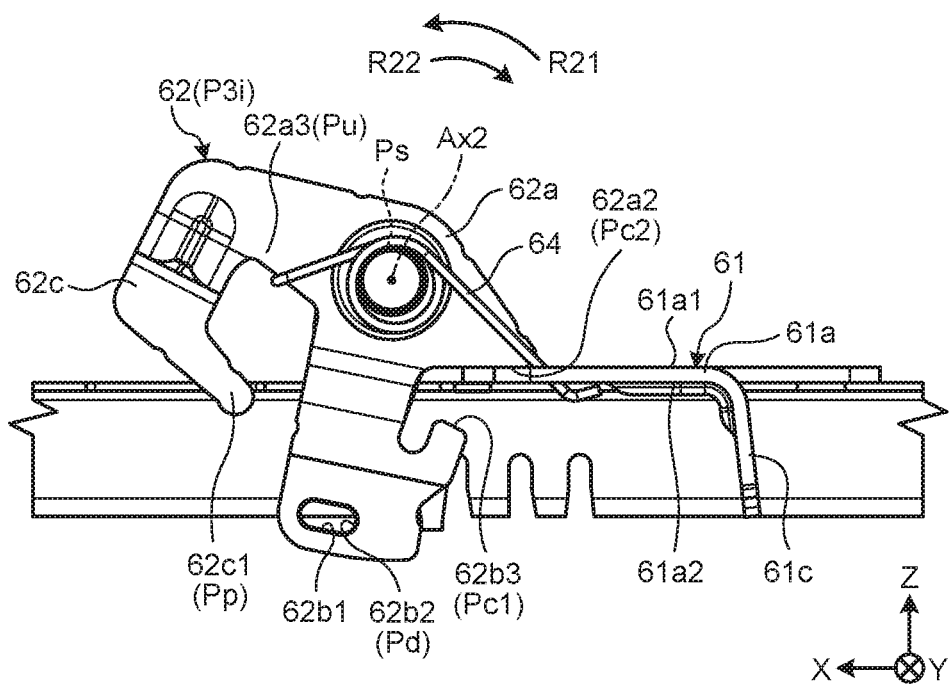
FIG. 22 is a schematic and exemplary side view of part of the slide lock releasing device of the vehicle seat according to the embodiment, and illustrates an operational member at an initial position.
Figure 23:
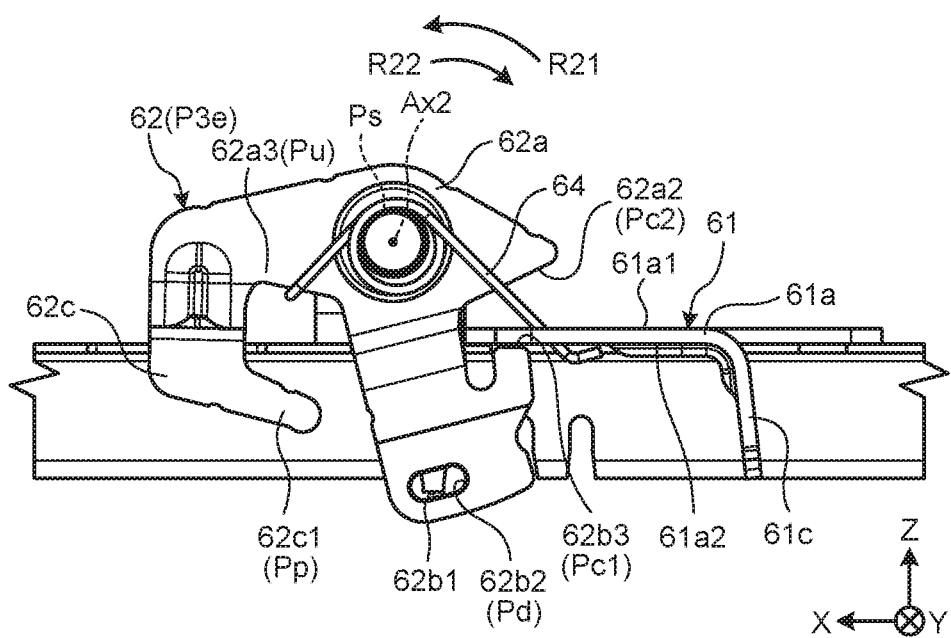
FIG. 23 is a schematic and exemplary side view of part of the slide lock releasing device of the vehicle seat according to the embodiment, and illustrates the operational member at a maximum rotational position.

FIGS. 22 and 23 are side views of part of the slide lock releasing device 60. FIG. 22 is a diagram illustrating the operational member 62 at an initial position P31, and FIG. 23 is a diagram illustrating the operational member 62 at a maximum rotational position P3e.

As described above, one end of the return spring 64 is hooked to the bottom wall 61a of the support member 61, and the other end of the return spring 64 is hooked to the front part 62a3 of the central wall 62a. With such a structure, the return spring 64 biases the operational member 62 in a direction R22.

At the initial position P31 in FIG. 22, the bottom end of the projection 62a2, located at the rear end of the central wall 62a of the operational member 62, contacts a top surface 61a1 of the bottom wall 61a. The top surface 61a1 of the bottom wall 61a functions as a stopper that restricts rotation of the operational member 62 in the direction R22. The bottom end of the projection 62a2 of the central wall 62a is an exemplary second contact part Pc2. The bottom wall 61a is an exemplary wall.

Along with the input wall 62b being pulled rearward by the inner wire 71, the operational member 62 is rotatable up to the maximum rotational position P3e in the direction R21. An angle (orientation) of the maximum rotational position P3e is defined by the pulling amount of the inner wire 71 and the rotational amount of the link member 51, that is, the forward tilt amount (angle) of the seat back 12 in the walk-in mode.

Along with the rotation of the operational member 62 in the direction R21, the projection 62c1 of the output wall 62c presses the lock member 41 (refer to FIGS. 17 and 18) downward. Thereby, the slide lock mechanism 40 transitions from the slide locked state to the slide unlocked state. As illustrated in FIGS. 22 and 23, the distal end of the projection 62c1 has a curved (cylindrical) shape. Thus, along with the rotation of the operational member 62 in the direction R21, the projection 62c1 presses the lock member 41 in line contact with the operational member 62 irrespective of a rotational angle. When released from being pulled by the inner wire 71, the operational member 62 is biased in the direction R22 by the return spring 64 and returned to the initial position P31. Thereby, the slide lock mechanism 40 transitions (returns) from the slide unlocked state to the slide locked state.

As illustrated in FIG. 23, a bottom surface 61a2 of the bottom wall 61a faces, with a gap, the projection 62b3 of the operational member 62 located at the maximum rotational position P3c. Thus, the bottom surface 61a2 of the bottom wall 61a contacts the projection 62b3 of the operational member 62 when caused to rotate in the direction R21 beyond the maximum rotational position P3e for some reason, and it can function as a spare stopper that restricts the operational member 62 from rotating further beyond the contact position in the direction R21. The distal end of the projection 62b3 is an exemplary first contact part Pc1.

As described above, in the slide lock releasing device 60, the edge of the through hole 62a1 in the central wall 62a of the operational member 62 is supported by the shaft 63 in a rotatable manner. Thus, at a supported part Ps illustrated in FIG. 22, the operational member 62 is supported by the support member 61 in a rotatable manner. The edge 62b2 of the through hole 62b1 in the input wall 62b of the operational member 62 is pulled by the inner wire 71. Thus, at the pulled part Pd illustrated in FIG. 22, the operational member 62 is pulled by the inner wire 71 (cable 70). The projection 62c1 of the output wall 62c of the operational member 62 presses the lock member 41. Thus, with a pressing part Pp illustrated in FIG. 22, the operational member 62 presses the lock member 41. The inner wire 71 (cable 70) is an exemplary input member. The input member is not limited to the inner wire 71 (cable 70).

As is understood from FIG. 21, in the present embodiment, the pulled part Pd and the pressing part Pp are offset from the supported part Ps oppositely in the vehicle lateral direction. Thus, in the present embodiment, the operational member 62 can be well balanced with respect to the supported part Ps in the vehicle lateral direction as compared with the pulled part Pd and the pressing part Pp offset from the supported part Ps in the same vehicle lateral direction, for example. Thus, according to the present embodiment, for example, the support member 61 can be prevented from being tilted or bent in the vehicle lateral direction when applied with force from the operational member 62.

In the present embodiment, as is understood from FIG. 19, both of the first contact part Pc1 and the pulled part Pd are set to the input wall 62b. Thus, the first contact part Pc1 and the pulled part Pd are aligned in a direction intersecting with the rotational center Ax2 (first direction) as viewed from above or front, for example. That is, the first contact part Pc1 and the pulled part Pd are not offset from each other along the rotational center Ax2 (vehicle lateral direction). The first contact part Pc1 and the pulled part Pd offset along the rotational center Ax2 means that the operational member 62 receives input force from the pulled part Pd and reaction force from the first contact part Pc1 at different locations along the rotational center Ax2, which causes force (moment of rotation) onto the operational member 62 to tilt along the rotational center Ax2. That is, the operational member 62 is likely to tilt, bend, or buckle along the rotational center Ax2. In this regard, according to the present embodiment, the first contact part Pc1 and the pulled part Pd are not offset from each other along the rotational center Ax2, so that the operational member 62 can be prevented from being inclined, bent, or buckled along the rotational center Ax2, for example.

In the present embodiment, as is understood from FIG. 19, both of the second contact part Pc2 and the biased part Pu are set to the central wall 62a. Thus, the second contact part Pc2 and the biased part Pu are aligned in the direction intersecting with the rotational center Ax2 (second direction) as viewed from above or front, for example. That is, the second contact part Pc2 and the biased part Pu are not offset from each other along the rotational center Ax2 (vehicle lateral direction). The second contact part Pc2 and the biased part Pu offset along the rotational center Ax2 means that the operational member 62 receives input force from the biased part Pu and reaction force from the second contact part Pc2 at different locations along the rotational center Ax2, which causes force (moment of rotation) onto the operational member 62 to tilt along the rotational center Ax2. That is, the operational member 62 is likely to tilt, bend, or buckle along the rotational center Ax2. In this regard, according to the present embodiment, the second contact part Pc2 and the biased part Pu are not offset from each other along the rotational canter Ax2, so that the operational member 62 can be prevented from being tilted, bent, or buckled along the rotational center Ax2, for example.

In the present embodiment, as is understood from FIGS. 22 and 23, the first contact part Pc1 and the second contact part Pc2 of the operational member 62 are able to contact the bottom surface 61a2 and the top surface 61a1 of the bottom wall 61a of the support member 61. Thus, the bottom wall 61a functions as a stopper for both of the first contact part Pc1 and the second contact part Pc2. This enables the slide lock releasing device 60 to be more compact or simpler in structure than the one including individual stoppers for the first contact part Pc1 and the second contact part Pc2, for example.

While certain embodiments have been described, these embodiments have been presented by way of example only, and are not intended to limit the scope of the inventions. Indeed, the embodiments described herein may be embodied in different other forms; various omissions, substitutions, combinations, and changes may be made without departing from the spirit of the inventions. The above embodiments are incorporated in the scope and spirit of the inventions and in the accompanying claims and their equivalents. Specifications of the elements and shapes (structure, kind, direction, form, size, length, width, thickness, height, number, arrangement, position, location, material, etc.) can be modified and carried out as appropriate.

EXPLANATIONS OF LETTERS OR NUMERALS

13 LOWER RAIL (RAIL)
14 UPPER RAIL (SLIDER)
41 LOCK MEMBER
60 SLIDE LOCK RELEASING DEVICE
61 SUPPORT NUMBER
61a BOTTOM WALL (WALL)
61a1 TOP SURFACE (WALL SURFACE)
61a2 BOTTOM SURFACE (WALL SURFACE)
62 OPERATIONAL MEMBER
62a CENTRAL WALL
62b INPUT WALL
71 INNER WIRE (CABLE, INPUT MEMBER)
Pc1 FIRST CONTACT PART
Pc2 SECOND CONTACT PART
Pd PULLED PART
Pp PRESSING PART
Ps SUPPORTED PART
Pu BIASED PART
R21 DIRECTION (FIRST ROTATIONAL DIRECTION)
R22 DIRECTION (SECOND ROTATIONAL DIRECTION)

The invention claimed is:

1. A vehicle-seat slide device, comprising:
a rail to be fixed to a floor, the rail extending in a front-back direction of a vehicle;
a slider slidably attached to the rail and fixed to a seat;
a lock member being movable between a lock position and a lock release position, the lock position at which the slider is locked to one of slide positions on the rail, the lock release position at which the slider is released from being locked to the rail;
a support member fixed to the slider; and
an operational member supported by the support member to be rotatable about a rotational center extending in a vehicle lateral direction, the operational member that receives an input from an input member to rotate in a first rotational direction around the rotational center to thereby move the lock member from the lock position to the lock release position, wherein
a pulled part of the operational member by the input member and a pressing part of the operational member relative to the lock member are offset in position in opposite directions from a supported part of the operational member by the support member in the vehicle lateral direction,
the operational member includes a first contact part that contacts the support member to restrict the operational member from rotating in the first rotational direction, and
the pulled part and the first contact part are included in an input wall located on one side of the supported part in the vehicle lateral direction.

2. A vehicle-seat slide device, comprising:
a rail to be fixed to a floor, the rail extending in a front-back direction of a vehicle;
a slider slidably attached to the rail and fixed to a seat;
a lock member being movable between a lock position and a lock release position, the lock position at which the slider is locked to one of slide positions on the rail, the lock release position at which the slider is released from being locked to the rail;
a support member fixed to the slider; and
an operational member supported by the support member to be rotatable about a rotational center extending in a vehicle lateral direction, the operational member that receives an input from an input member to rotate in a first rotational direction around the rotational center to thereby move the lock member from the lock position to the lock release position;
a biasing member that biases the operational member in a second rotational direction around the rotational center, the second rotational direction being opposite to the first rotational direction, wherein
a pulled part of the operational member by the input member and a pressing part of the operational member relative to the lock member are offset in position in opposite directions from a supported part of the operational member by the support member in the vehicle lateral direction, the operational member includes a second contact part that contacts the support member to restrict the operational member from rotating around the rotational center in the second rotational direction, the second contact part and a biased part of the operational member are included in a central wall supported by the support member, the biased part being applied with biasing force by the biasing member, the operational member includes a first contact part that contacts the support member to restrict the operational member from rotating in the first rotational direction, the pulled part and the first contact part are included in an input wall located on one side of the supported part in the vehicle lateral direction, the support member includes a wall, and the first contact part and the second contact part are able to contact opposite surfaces of the wall.

\* \* \* \* \*